United States Patent [19]

Koizumi et al.

[11] Patent Number: 5,008,690

[45] Date of Patent: Apr. 16, 1991

[54] IMAGE RECORDING APPARATUS FOR TRANSFERRING INK PATTERNS FORMED BY SELECTIVE APPLICATION OF ENERGY THROUGH ELECTRODES OF A RECORDING HEAD CONTROLLABLY BIASED AGAINST INK TRANSPORTED ON A ROLLER

[75] Inventors: Norihiko Koizumi; Hiroshi Tanioka, both of Yokohama; Noboru Toyama; Kozo Arahara, both of Kawasaki; Toshiya Yuasa, Mitaka, all of Japan

[73] Assignee: Canon Kabushiki Kaisha, Tokyo, Japan

[21] Appl. No.: 281,453

[22] Filed: Dec. 8, 1988

[30] Foreign Application Priority Data

| | | | |
|---|---|---|---|
| Dec. 10, 1987 | [JP] | Japan | 62-311025 |
| Jan. 12, 1988 | [JP] | Japan | 63-003117 |
| Jan. 22, 1988 | [JP] | Japan | 63-010847 |
| Jan. 22, 1988 | [JP] | Japan | 63-010849 |

[51] Int. Cl.[5] .......... B41J 2/33; B41J 2/35; B41J 2/40; B41J 2/42; G01D 15/16; G01D 15/20

[52] U.S. Cl. .......... 346/140 R; 346/76 PH; 346/150

[58] Field of Search .......... 346/76 PH, 150, 140 R; 400/120

[56] References Cited

U.S. PATENT DOCUMENTS

| | | | |
|---|---|---|---|
| 4,451,136 | 5/1984 | Tanoika et al. . | |
| 4,462,035 | 7/1984 | Koto | 346/76 PH |
| 4,675,701 | 6/1987 | Chu | 346/76 PH |
| 4,711,558 | 12/1987 | Tanioka et al. . | |
| 4,724,490 | 2/1988 | Tanioka . | |
| 4,734,358 | 3/1988 | Oguchi et al. . | |
| 4,745,030 | 5/1988 | Arahara et al. . | |
| 4,808,227 | 2/1989 | Yuasa et al. . | |
| 4,855,763 | 8/1989 | Kan . | |

FOREIGN PATENT DOCUMENTS

| | | | |
|---|---|---|---|
| 028873 | 3/1981 | Japan | 400/120 |
| 272174 | 12/1986 | Japan | 346/76 PH |

OTHER PUBLICATIONS

IBM Technical Disclosure Bulletin, vol. 27, No. 12, May 1985, pp. 7212–7213.

*Primary Examiner*—Benjamin R. Fuller
*Assistant Examiner*—Scott Rogers
*Attorney, Agent, or Firm*—Fitzpatrick, Cella, Harper & Scinto

[57] ABSTRACT

An image recording apparatus for recording images on a recording medium has ink transport means for transporting fluid ink energy applying means for selectively applying to the ink transported by the ink transport means, transfer means for transferring to the recording medium the ink whose transfer characteristics has been changed in conformity with the selective application of the energy, coating means disposed upstream of the energy applying means with respect to the direction of transport of the ink by the ink transport means for supplying the ink onto the ink transport means, and biasing means for biasing the energy applying means against the ink transported by the ink transport means.

4 Claims, 27 Drawing Sheets

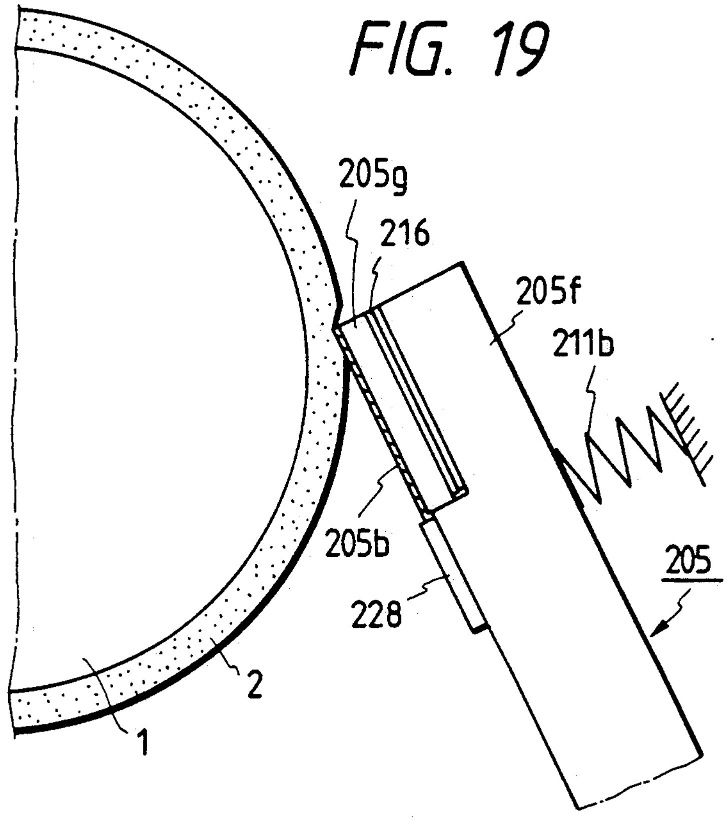
FIG. 19
FIG. 20
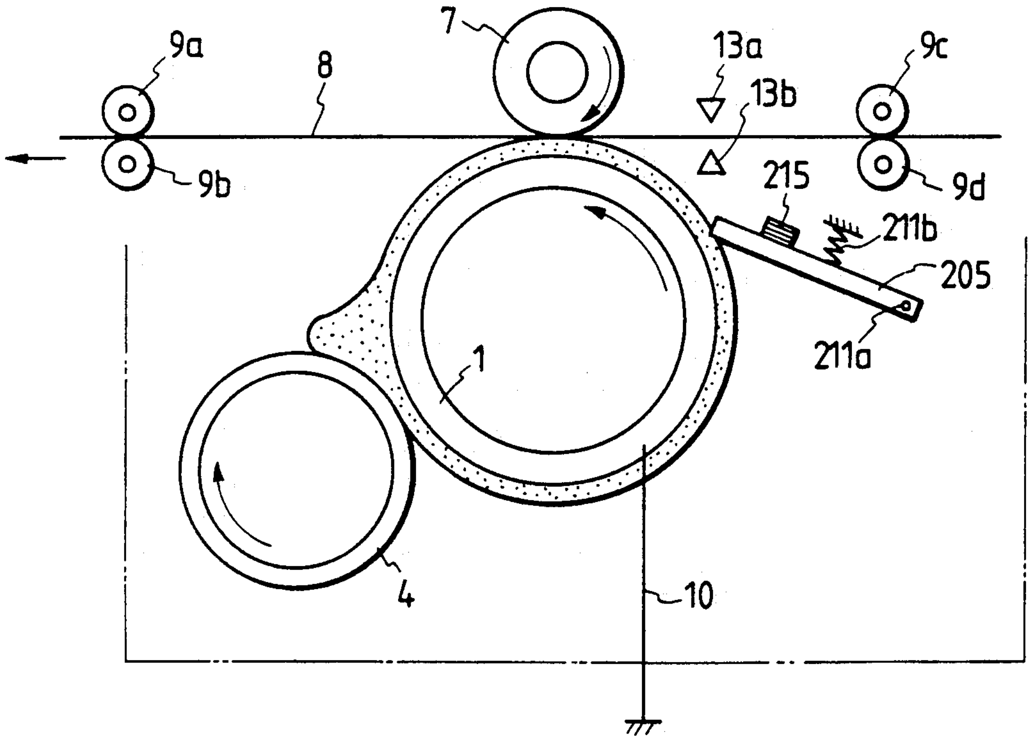

IMAGE RECORDING APPARATUS FOR TRANSFERRING INK PATTERNS FORMED BY SELECTIVE APPLICATION OF ENERGY THROUGH ELECTRODES OF A RECORDING HEAD CONTROLLABLY BIASED AGAINST INK TRANSPORTED ON A ROLLER

BACKGROUND OF THE INVENTION

1. Field of the Invention

This invention relates to an image recording apparatus which is capable of recording images on a recording medium at a low cost by the use of fluid ink.

2. Related Background Art

Today, as recording systems for information processing which are capable of recording on plain paper, there have been developed various types such as an impact printer, an electrophotographic printer, a laser beam printer and a thermosensitive transfer type printer.

Among these, the thermosensitive transfer type recording apparatus has been widely used because of its low noise and its capability of being made compact. This recording system uses an ink ribbon comprising a base sheet having heat-meltable ink applies thereonto, and heats the ink ribbon into the form of an image pattern by a recording head to thereby transfer the melted ink to a recording sheet, and it has merits such as low noise, the capability of being made into a relatively compact apparatus and low cost of the apparatus.

However, such conventional thermosensitive transfer system is not free of problems. In the conventional thermosensitive transfer system, when manufacturing the ink ribbon, heat-meltable ink must be applied to a heat-resisting base sheet by a complicated process. Also, this ink ribbon must be discarded after used only once for recording, and this has led to a problem such as a high running cost.

So, as a means for eliminating the above-noted problems, the applicant has proposed a recording apparatus in which fluid ink is transported in the form of a film by ink transport means, predetermined energy is selectively applied to this ink to form an ink image endowed with tackiness in the form of an image pattern and this ink image is transferred to recording medium (Japanese Patent Application No. 61-175191).

According to this recording apparatus, it is unnecessary to use an ink ribbon as in the conventional thermosensitive transfer system, and only the ink forming an ink image is transferred to the recording medium and the ink which does not form the ink image can be repetitively used.

The applicant, claiming priority based on the aforementioned Japanese Patent Application No. 61-175191 (filed on Jul. 25, 1986), Japanese Patent Application No. 61-216752 (filed on Sept. 13, 1986), Japanese Patent Application No. 62-1709 (filed on Jan. 9, 1987), Japanese Patent Application No. 62-98590 (filed on Apr. 23, 1987) and Japanese Patent Application No. 62-131584 (filed on May 29, 1987) and uniting these Japanese applications, filed a U.S. application (Ser. No. 75,045, filed in U.S. on Jul. 17, 1987, U.S. Pat. No. 4,881,084), a German application (No. 3724576.7, filed in Germany on Jul. 24, 1987), a French application (No. 87-10576, filed in France on Jul 24, 1978) and a British application (No. 87-17565, filed in Great Britain on Jul. 24, 1987).

The invention of the present application which will hereinafter be described has been further developed from the inventions covered by the applicant's aforementioned Japanese, U.S., German, French and British applications. The invention of the present application which will hereinafter be described permits the image recording ink and the image recording method made clear in the specifications of the aforementioned applications to be suitably applied thereto.

SUMMARY OF THE INVENTION

It is an object of the present invention to provide an image recording apparatus which can record clear-cut images on a recording medium.

It is another object of the present invention to provide an image recording apparatus which can record images on a recording medium at a low cost.

It is still another object of the present invention to provide an image recording apparatus which can record images on a recording medium without using a conventional so-called ink ribbon.

It is yet still another object of the present invention to provide an image recording apparatus in which ink is supplied to the surface of ink transport means at a uniform thickness, whereby images of high quality can be obtained with image blanks or the like prevented.

It is a further object of the present invention to provide an image recording apparatus in which the contact between an ink layer and energy applying means is ensured to prevent occurrence of image blanks and distortion or the like of images, whereby clear-cut images can be obtained.

It is still a further object of the present invention to provide an image recording apparatus in which during non-recording, energy applying means can be spaced apart from ink on ink transport means.

It is yet still a further object of the present invention to provide an image recording apparatus in which even if the thickness of an ink layer applied to ink transport means varies, a flexible energy applying portion resiliently bears against the ink layer, whereby the bearing condition does not change and accurate energy application is effected from the energy applying portion to the ink layer.

It is another object of the present invention to provide an image recording apparatus in which when applying energy with energy applying means bearing against an ink layer applied to ink transport means, if the energy applying means is minutely vibrated by vibrating means, the contact between the ink layer and the energy applying means takes place intermittently and it becomes difficult for ink to adhere to the energy applying means, whereby cramp of the ink layer and trail of the ink image are eliminated.

It is still another object of the present invention to provide an image recording apparatus in which during non-recording, energy applying means is spaced apart from ink on ink transport means by contacting and spacing means, whereby the energy applying means can be protected and unnecessary adherence of the ink to the energy applying means can be prevented.

BRIEF DESCRIPTION OF THE DRAWINGS

FIG. 19 illustrates another embodiment of vibrating means.

FIG. 20 illustrates an embodiment in which an intermediate transfer roller is not provided.

DESCRIPTION OF THE PREFERRED EMBODIMENTS

Some embodiments of a recording apparatus to which the present invention is applied will hereinafter be described with reference to the drawings.

Figure 1:
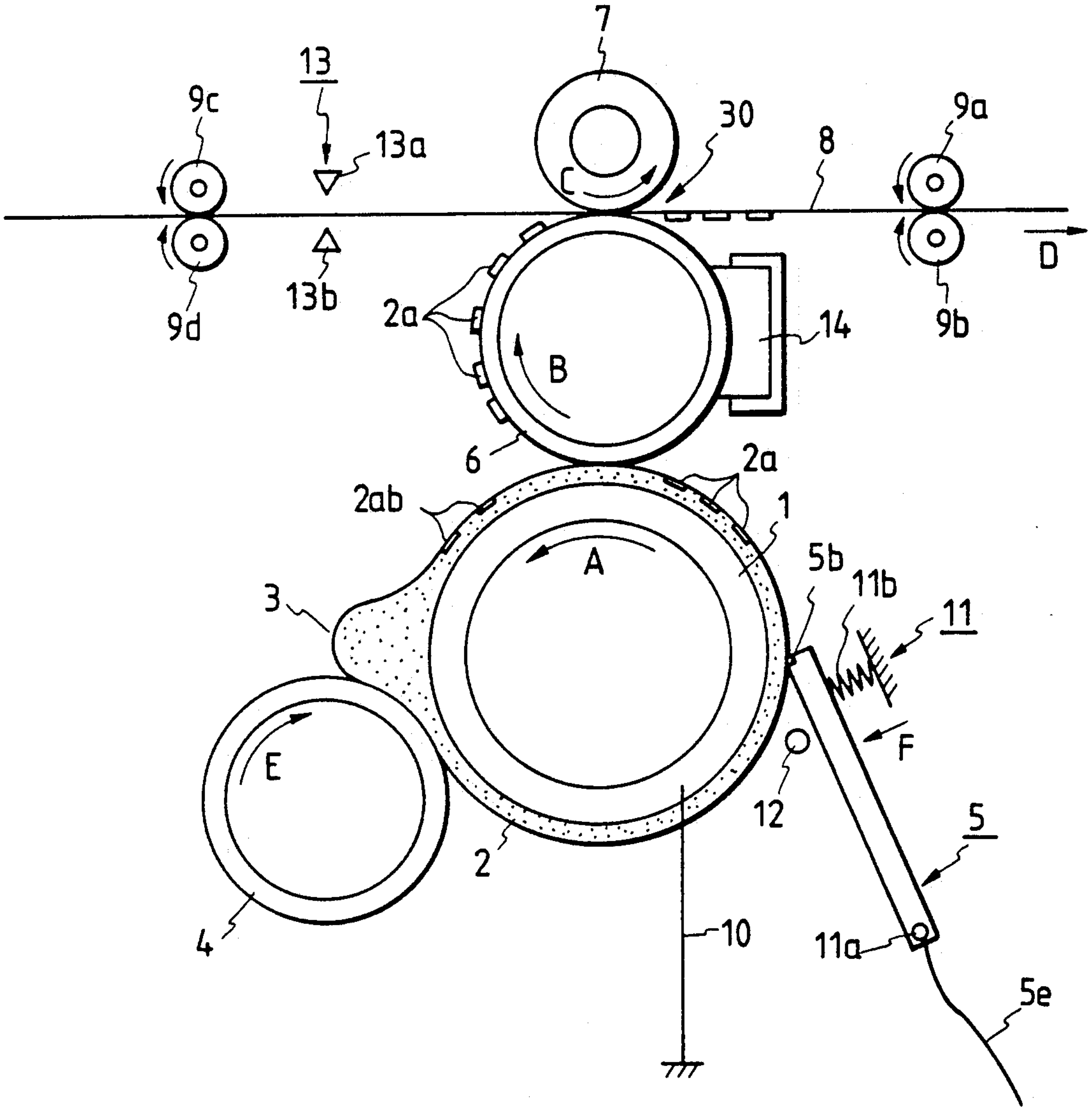
FIG. 1 is a cross-sectional view of a recording apparatus according to an embodiment of the present invention.
Figure 2:
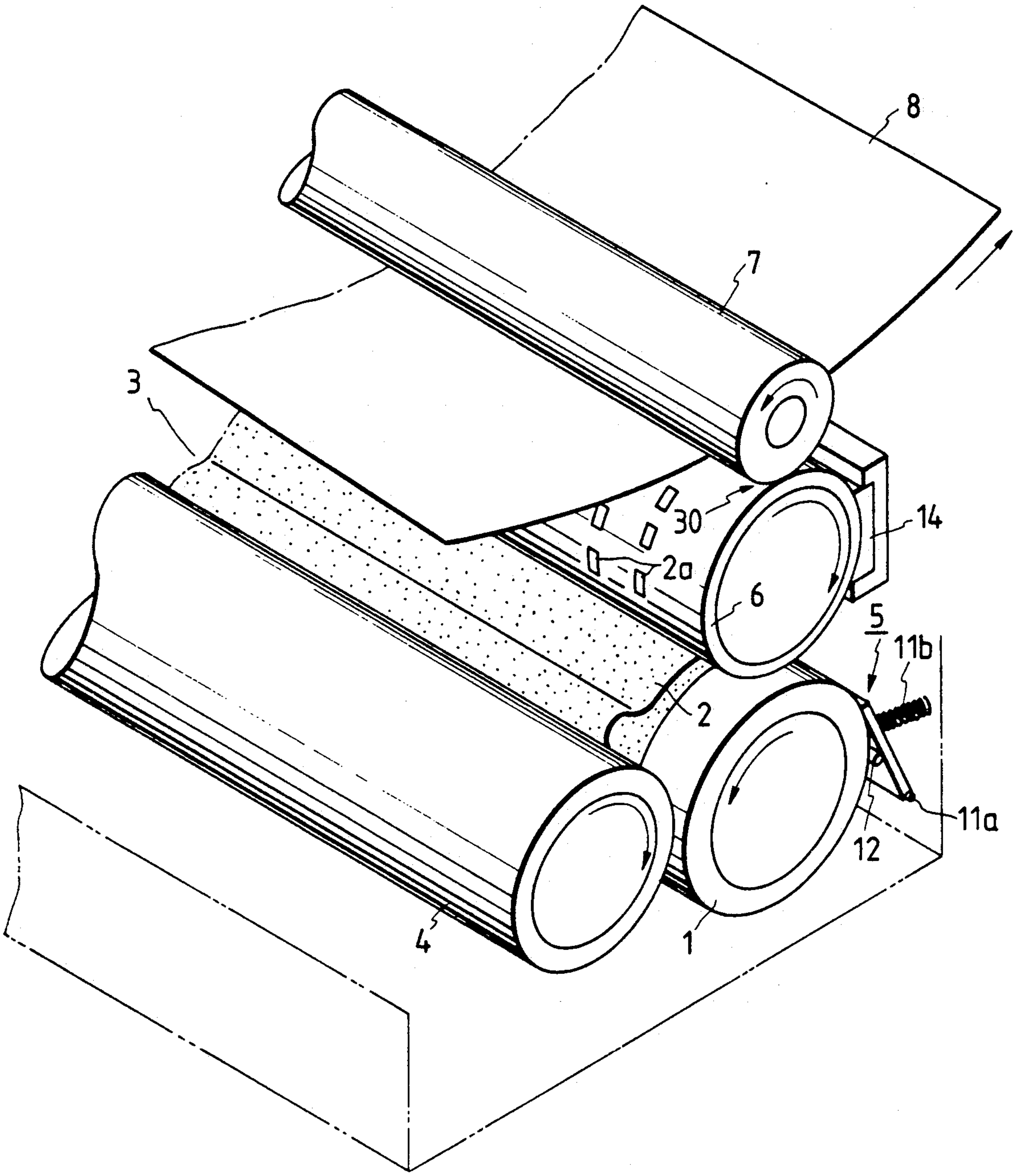
FIG. 2 is a perspective view of the FIG. 1 apparatus.

FIG. 1 is a cross-sectional view of a recording apparatus according to a first embodiment, and FIG. 2 is a perspective view thereof.

The outline of the general construction will first be described. An ink transport roller 1 which is ink transport means is provided for rotation in the direction of arrow A (counter-clockwise direction) while transporting fluid ink 2 contained in an ink reservoir 3.

The ink 2 has a fluid film forming property and usually does not substantially have tackiness, but has the property of having tackiness when predetermined energy such as electrical energy is applied thereto. Accordingly, when the ink transport roller 1 is rotated, the surfact of the ink transport roller 1 is coated with the ink 2 to a predetermined layer thickness by a coating means 4 and the ink is transported with the rotation of the ink transport roller 1.

Electrical energy or the like is imparted in the form of an image pattern to the ink 2 formed into a predetermined layer on the surface of the ink transport roller 1, by energy applying means 5 controlled by a control system, whereby an ink image 2*a* endowed with tackiness is formed. This ink image 2*a* contacts with an intermediate transfer roller 6 which is an intermediate transfer medium rotating in the direction of arrow B in FIG. 1 (clockwise direction), whereby it is transferred to the surface of the roller 6.

The ink image 2*a* transferred to the intermediate transfer roller 6 is transferred to a recording medium such as plain paper or a plastic sheet and hereinafter referred to as the recording sheet 8 conveyed between a transfer roller 7 constituting transfer means urged against the intermediate transfer roller 6 and rotatable in the direction of arrow C in FIG. 1 (counter-clockwise direction) and the intermediate transfer roller 6, and the recording sheet 8 having the predetermined image recorded thereon is discharged in the direction of arrow D (rightward as viewed in FIG. 1) by a pair of conveying rollers 9*a* and 9*b*.

On the other hand, that part of the ink 2 which has not been transferred to the intermediate transfer roller 6 is again contained in the ink reservoir 3 with the rotation of the ink transport roller 1 for reuse.

The constructions of the various portions of the aforedescribed recording apparatus will now be described in detail.

First, the ink transport roller 1 is formed of a material capable of forming the fluid ink 2 into a layer on the surface thereof and transporting it, and in the present embodiment, an electrically conductive member formed of a metal such as stainless steel, aluminum or iron is formed into a cylinder having an outer diameter of about 40 mm and is designed to be rotatively driven at a predetermined speed in the direction of arrow A.

The surface of the ink transport roller 1 formed of said material may be smooth, but preferably may be made moderately coarse to enhance the conveying and carrying property thereof for the fluid ink 2.

Description will now be made of the fluid ink 2 transported by the ink transport roller 1. This ink 2 is fluid under the application of a predetermined extraneous force and has the fluid film forming property of forming a film of ink, and more specifically has the property of forming an ink layer on the surface of the roller 1 and being transported with the rotation of the ink transport roller 1. Also, this ink 2 may preferably be ink having the property of being capable of restoring tackiness with time after it is cut by an extraneous force. That is, the property that when lumps of ink contact with each other, the interface disappears and the lumps become integral with each other is preferable.

Ink having a gel state in a broad sense retaining a solvent by a bridge structure substance, for example, the ink described in the applicant's prior Japanese Patent Application No. 61-175191 or No. 62-131586, is preferable as the ink 2 having said properties.

Such ink 2 has a fluid film forming property, but does not substantially have tackiness and has such a property that when electrical energy or the like is applied thereto, tackiness is imparted thereto. The word "tackiness" used herein refers to selective tackiness, and more particularly refers to the fact that when the ink 2 is brought into contact with a body such as the intermediate transfer roller 6, part of the ink 2 separates from the whole ink and adheres to the body, and has nothing to do with whether the whole ink is tacky.

Accordingly, the ink layer formed on the surface of the ink transport roller 1 when no energy is imparted thereto, is not substantially transferred to other medium, for example, the intermediate transfer roller 6 even if it contacts with the intermediate transfer roller 6. This is considered to be attributable to the fact that in gel-like ink, the solvent is retained by the bridge structure (except some amount of solvent).

On the other hand, when electrical energy or the like is applied to said gel-like ink, the bridge structure changes, whereby tackiness corresponding to the application of said energy is considered to be imparted to the ink.

Further, it is preferable that the ink 2 have a property as a plasticizer when it is applied as a coating to the ink transport roller 1 and that the ink 2 have a property as an elastic material from after energy is applied thereto by the energy applying means 5 until the ink comes to the intermediate transfer roller 6.

Therefore, the ink 2 in the present embodiment may preferably have a certain degree of visco-elasticity (complex elasticity having an elasticity term and a viscosity term).

Figure 3A:
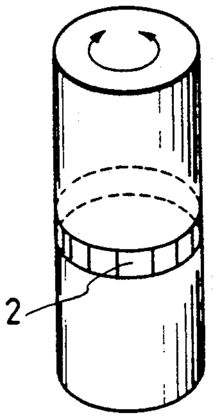
FIGS. 3A and 3B illustrate a method of measuring visco-elasticity.
Figure 3B:
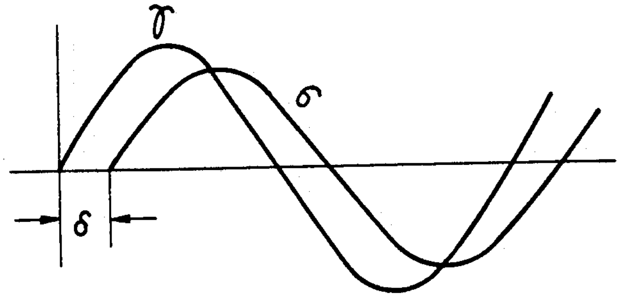

As the range of said visco-elasticity, when with the ink 2 as a sample of diameter 25 mm and thickness 2 mm as shown in FIGS. 3A and 3B, a sine strain $\gamma$ of angular speed 1 rad/sec. is imparted thereto in the direction of arrow (the direction of sliding) and the stress $\sigma$ and the phase deviation $\delta$ thereof are detected to find the complex elastic modulus $G^*$, ink is preferable which satisfies the following relation:

$$G^* = \sigma/\gamma \equiv G' + G''.$$

$G'$: stored elastic modulus $G''$: lost elastic modulus that is, in which the value of the ratio $G''/G'$ of the stored elastic modulus $G'$ to the lost elastic modulus $G'$ is about 0.1–10.

This is because if in said complex elastic modulus, the value of said $G''/G'$ is less than 0.1, the behavior as the plasticizer will be deficient and the ink coating to the ink transport roller 1 will become insufficient and if the value of said $G''/G'$ exceeds 10, the behavior as the elastic material will be deficient and the restoration of elasticity from the energy applying means 5 to the intermediate transfer roller 6 will become insufficient.

The size of said sample and the manner in which the strain is imparted are of values which seem to be appropriate in the recording apparatus.

In the present embodiment, the fluid ink 2 is composed of the following components:

| | | |
|---|---|---|
| A | Propylene glycol | 80 parts by weight |
| | Water | 20 parts by weight |
| | Polyvinyl alcohol (Gorsenol GL-03 produced by Nippon Gosei Kagaku K.K.) | 24 parts by weight |
| | Potassium iodide | 14 parts by weight |
| | Carbon black (Star Ring SR produced by Cabot, Inc., U.S.A.) | 10 parts by weight |

-continued

| | | |
|---|---|---|
| B | 1N-NoOH water solution | 3.3 parts by weight |
| | 20% by weight sodium borate propylene glycol solution | 3.3 parts by weight |

The above-mentioned component A was uniformly dissolved while being heated to 80°–90° C., whereafter the above-mentioned component B was added thereto and agitated, whereby gel-like ink 2 was obtained.

Next, the coating means 4 is disposed upstream of the energy applying means 5 with respect to the direction of rotation of the ink transport roller 1, and is for coating the surface of the ink transport roller 1 with said ink 2 to a predetermined layer thickness. In the present embodiment, this coating means 4, as shown in FIG. 1, comprises a coating roller 4 of stainless steel having an outer diameter of about 30 mm and rotatably provided and is designed to coat the surface of the ink transport roller 1 with the ink 2 by the coating roller 4 being rotated in the direction of arrow E in FIG. 1 (clockwise direction).

The thickness of the layer of the ink 2 formed on the surface of the ink transport roller 1 by the coating roller 1 differs by the components of the ink 2, the gap between the ink transport roller 1 and the coating roller 4 and the peripheral speeds of these two rollers, but may preferably be about 0.1–5 mm, and more preferably be about 0.5–3 mm at the ink transfer position whereat the ink transport roller 1 is opposed to the intermediate transfer roller 6.

In the present embodiment, design is made such that an ink layer having a layer thickness of about 1.2 mm is formed on the surface of the ink transport roller 1 by setting the peripheral speed of the ink transport roller 1 to 20 mm/sec., the peripheral speed of the coating roller 4 to 24 mm/sec. and the gap between the two rollers to 1.0 mm.

The energy applying means 5 will now be described. This means may be a conventional thermal head which selectively applies heat energy, but in the present embodiment, from the viewpoint of energy efficiency, a recording head 5 comprising a number of electrodes is used to apply electrical energy.

Figure 4:
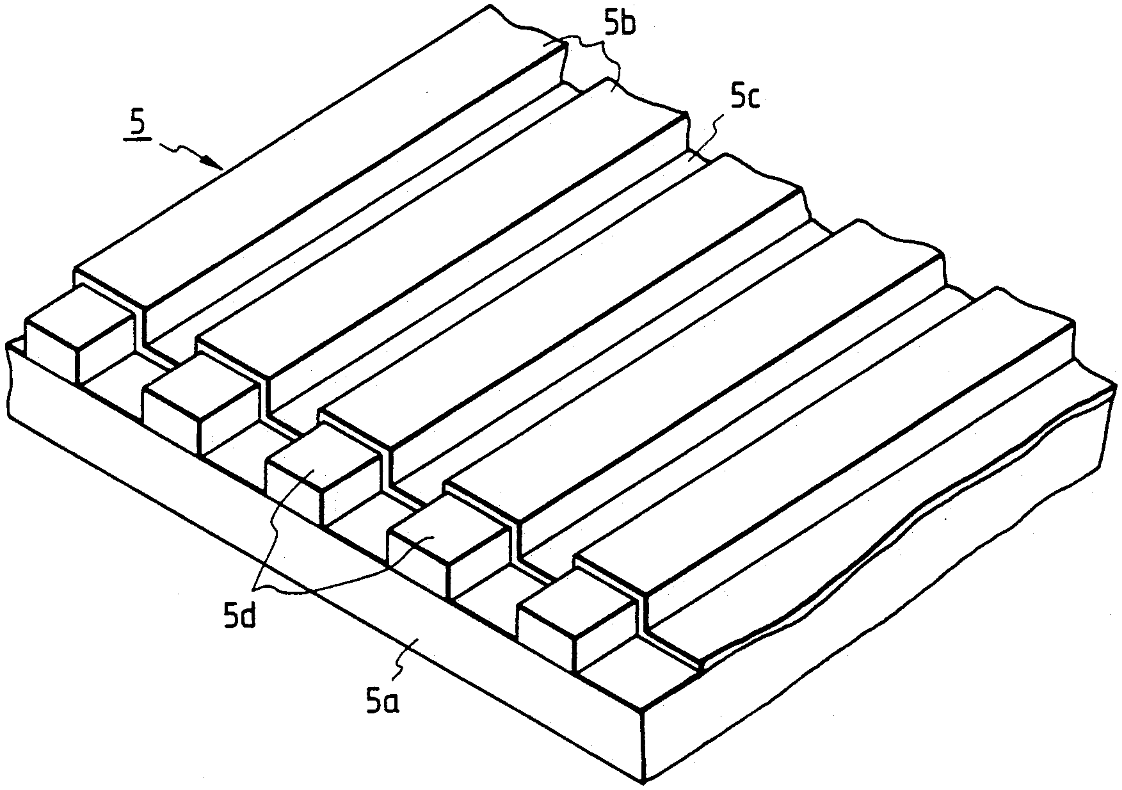
FIG. 4 illustrates the construction of a recording head.

This recording head 5, as shown in FIG. 4, comprises a base body **5*a* formed of an insulative material such as glass epoxy, alumina or glass and a plurality of electrodes 5*b* formed of a metal such as copper and arranged in a row on the base body 5*a*. An insulative film 5*c* formed of polymide or the like is provided on the other portion of the electrodes 5*b* than the fore end portion thereof, i.e., the other portion than the portion which contacts with the ink 2 to thereby form electrode elements (the fore end portions of the electrodes which are exposed from the insulative film) 5*d* at the fore end portions. Application of energy by the recording head 5 is accomplished in such a manner that as shown in FIG. 1, the individual electrodes 5*a* are electrically energized in conformity with an image signal transmitted from a control system through a flexible signal cable 5*e*, whereby the ink transport roller 1 grounded by an earth line 10 is electrically energized through the layer of the ink 2 which is in contact with the electrode elements 5*d*, whereby electrical energy is applied to the layer of the ink 2. The electrode elements 5*d*** may preferably be plated with gold, platinum or rhodium, and more preferably be plated with platinum from the viewpoint of durability.

Figure 5:
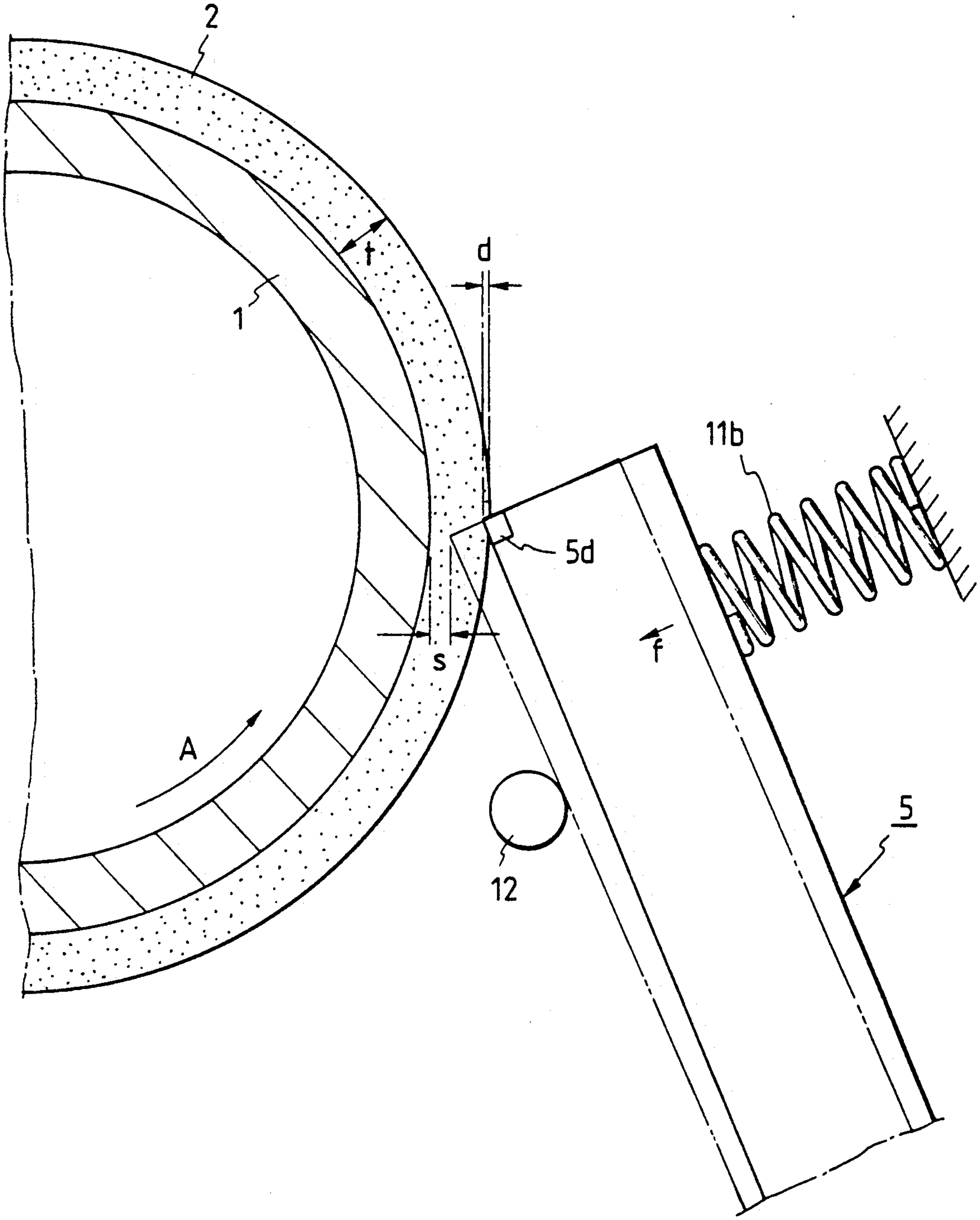
FIG. 5 illustrates a state in which the biased recording head bears against an ink layer.

Further, the recording head 5 is biased toward the ink transport roller 1 by biasing means 11 so that the electrode elements 5_d_ may reliably bear against the ink layer on the ink transport roller 1. That is, as shown in FIG. 1, the recording head 5 has its base portion mounted for pivotal movement about a shaft 11_a_ and the fore end portion of the head is biased in the direction of arrow F, i.e., toward the ink transport roller 1, with a predetermined biasing force by a pressing spring 11_b_. Accordingly, the electrode elements 5_d_, as shown in FIG. 5, are adapted to contact with the ink layer 2 with a biasing force f and enter into the ink layer having visco-elasticity by a depth d. The biasing force f may be suitably set with the visco-elastic characteristic of the ink 2 used and the thickness of the ink layer or the recording speed and the energization conditions taken into account, and it is preferable in enhancing the energization efficiency to set the biasing force f so that the amount of said entry is of the order of 0–1 mm, preferably, about 0–0.5 mm.

In the present embodiment, the recording head 5 having a length of 21 cm is biased with 30 g/cm ($30\times21=630$ g) by the pressing spring 11_b_ and the amount of entry d into the ink layer is set so as to be 0.05–0.1 mm.

Also, when the recording head 5 is biased toward the ink transport roller 1 as previously described, in the state in which the ink transport roller 1 is not coated with the ink 2, it is conceivable that the electrode elements 5_d_ directly contact with the ink transport roller 1 and the electrode elements 5_d_ become broken off or further, when the electrode elements 5_d_ are electrically energized during recording, an excessively great current flows from the electrode elements 5_d_ directly to the ink transport roller 1 to thereby melt the electrode elements 5_d_ or destroy the electrode driving circuit. So, to eliminate such inconvenience, it is preferable to provide controlling means for preventing the recording head 5 from directly contacting with the ink transport roller 1.

In the present embodiment, a stop pin 12 is provided as the controlling means so that when no ink layer is formed on the ink transport roller 1, the recording head 5 biased by the spring 11_b_ bears against the stop pin 12 to thereby prevent the electrode elements 5_d_ from directly contacting with the ink transport roller 1. More specifically, the stop pin 12 is disposed so that the gap S between the surface of the ink transport roller 1 and the fore end portion of the recording head 5 is of the order of 0.5 mm when the recording head 5 bears against the stop pin 12.

Description will now be made of the amount of electrical energization when recording is effected by the recording head 5 which is accurately in contact with the ink layer applied onto the ink transport roller 1 by the biasing means 11 and the controlling means 12. Where, for example, polyvinyl alcohol bridged by ion borate is used as the bridge structure substance for the ink 2, said amount of electrical energization may be an amount of electrical energization required to cause an electro-chemical variation in the ink 2. Said amount of electrical energization may be application of low energy of the order of 1/10 of the amount of electrical energization when heat energy is applied by a thermal head, for example, in heat transfer or the like, whereby the ink 2 comes to have tackiness.

Next, the intermediate transfer roller 6 is a member to which is transferred the ink image 2_a_ endowed with tackiness by said energy being applied thereto, and in the present embodiment, a cylindrical member of stainless steel having an outer diameter of 30 mm is disposed above the ink transport roller 1 with a spacing of about 1.0–1.2 mm kept with respect to the surface of the ink transport roller 1, and is adapted to contact with the ink layer applied onto the ink transport roller 1, and is rotatable in the direction of arrow B by driving means.

As the material forming the surface of the intermediate transfer roller 6, use can be made of a material similar to the material forming the surface of the ink transport roller 1, and the surface of this intermediate transfer roller 6 may preferably be subjected to a plating treatment such as chromium plating or be coated with silicon resin, fluorine resin, polyethylene resin or the like to thereby improve the smoothness and the anti-contamination property or the ease of cleaning. Also, for the improved transfer ability of the ink 2 at the ink transfer position, it is preferable to make the surface of this intermediate transfer roller 6 smoother than the surface of the ink transport roller 1.

Next, the transfer roller 7 constitutes transfer means for transferring the ink image 2_a_ transferred to and formed on the intermediate transfer roller 6 to the recording sheet 8, and in the present embodiment, the transfer roller 7 comprising a cylindrical member formed of nitrile rubber or silicone rubber is mounted on a metallic shaft and urged against the intermediate transfer roller 6 with a pressure force of about 0.1–5 kgf/cm by a spring or the like, not shown. The transfer roller 7 is designed to follow the rotation of the intermediate transfer roller 6 and rotate in the direction of arrow C, and cooperate with the intermediate transfer roller 6 to convey the recording sheet 8 in the direction of arrow D and transfer the ink image 2_a_ formed on the intermediate transfer roller 6 to the recording sheet 8.

In FIG. 1, the reference characters 9_a_, 9_b_, 9_c_ and 9_d_ designate conveying rollers for conveying the recording sheet 8 correspondingly to the recording operation. The reference numeral 13 denotes a resist sensor comprising a light-emitting element 13_a_ and a light-receiving element 13_b_. The resist sensor 13 is for detecting the recording sheet 8 being conveyed. The reference numeral 14 designates cleaning means having felt or the like adapted to contact with the surface of the intermediate transfer roller 6 and provided downstream of the urged position of the transfer roller 7 with respect to the direction of rotation of the intermediate transfer roller 6. The cleaning means 14 is for removing any untransferred ink from the intermediate transfer roller 6 when such untransferred ink is created during the transfer of the ink image 2_a_ to the recording sheet 8.

A control system for driving the various members of the recording apparatus will now be described briefly.

Figure 6:
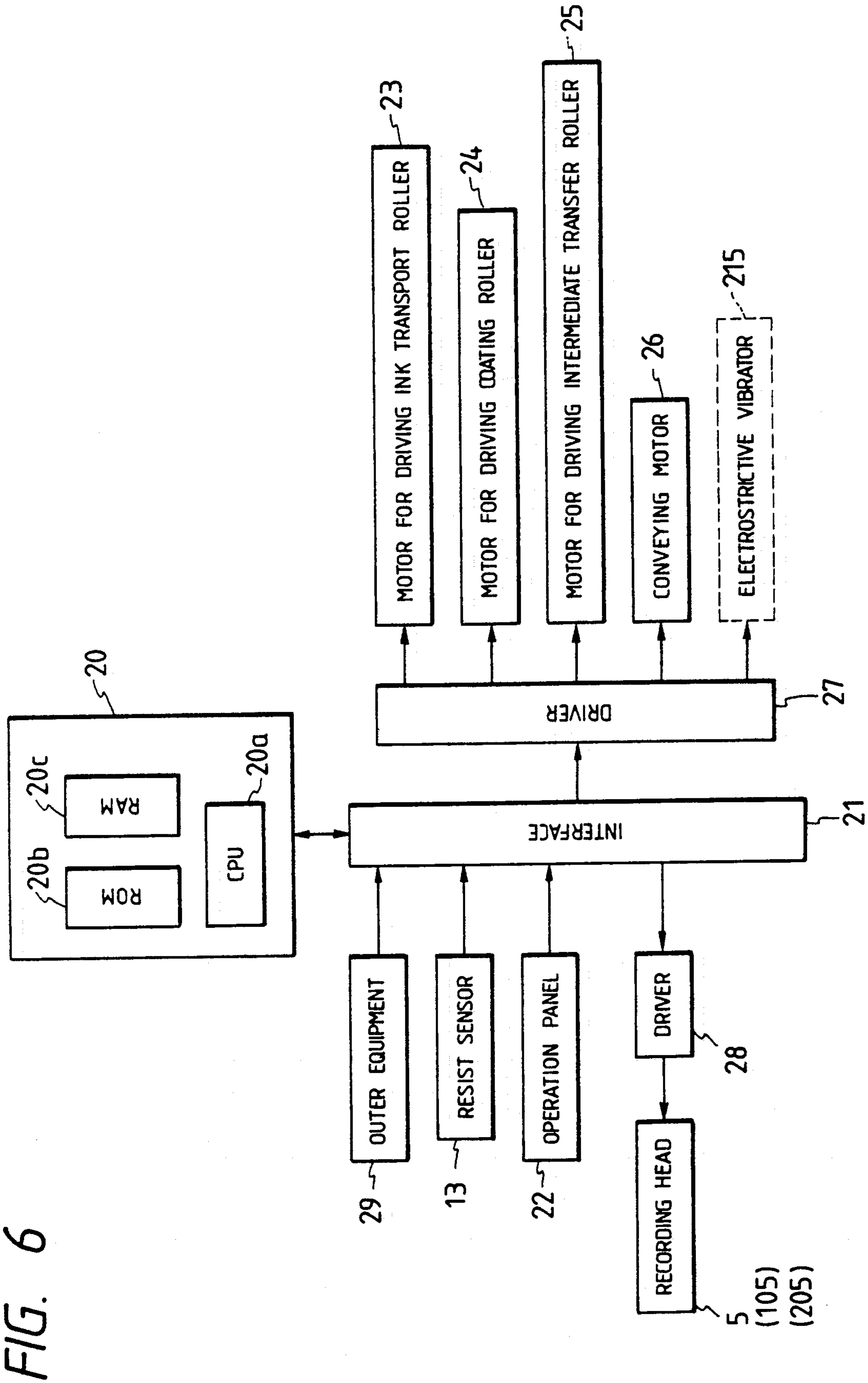
FIG. 6 is a block diagram of a driving control system.

This control system, as shown in FIG. 6, comprises a control unit 20 provided with a CPU 20_a_ such as a microprocessor, an ROM 20_b_ storing therein the control program of the CPU 20_a_ and various data, and an RAM 20_c_ used as the work area of the CPU 20_a_ and temporarily preserving various data, an interface 21, an operation panel 22, a driver 27 for driving various motors (a motor 23 for driving the ink transport roller, a motor 24 for driving the coating roller, a motor 25 for driving the intermediate transfer roller, and a conveying motor 26 for driving the conveying rollers), and a driver 28 for driving the recording head.

The control unit 20 receives as inputs various kinds of information (such as recording density, number of records and size of record) from the operation panel 22 through the interface 21, and receives as inputs a signal from the resist sensor 13 and image signals from an outer equipment 29. Also, the control unit 20 outputs motor ON-OFF signals for driving the motors 23-26 through the interface 21 and image signals, and drives the various members by said signals.

Figure 7:
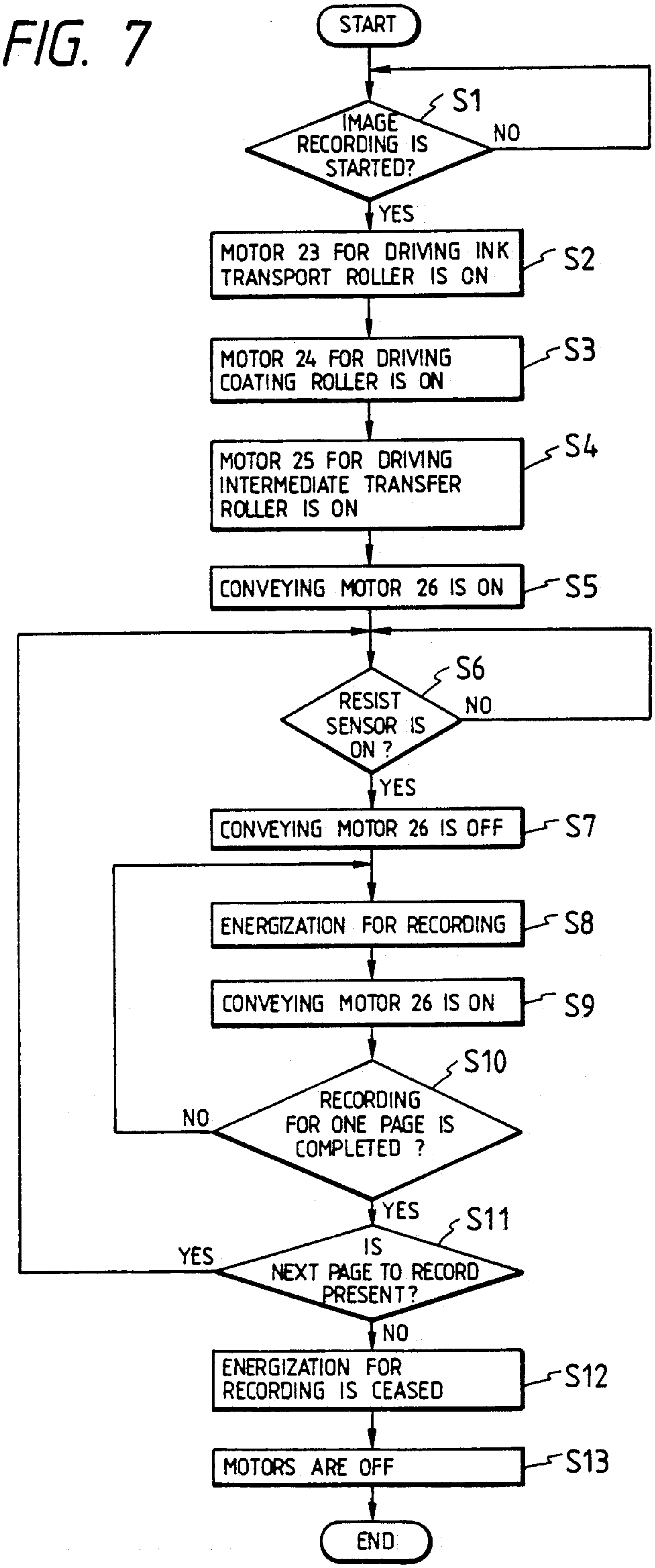
FIG. 7 is a flow chart of the operation.

The operation when recording is effected by the use of the recording apparatus constructed as described above will now be described with reference to the flow chart of FIG. 7.

When an image recording start signal is input by a recording start switch or the like (S1), the motors 23-26 are driven, whereby the ink transport roller 1, the coating roller 4, the intermediate transfer roller 6 and the conveying rollers 9*a*-9*d* are rotated in the directions of arrows, respectively, in FIG. 1, and the ink transport roller 1 is coated with an ink layer and the recording sheet 8 is conveyed (S2-S5).

Next, when the leading end edge of the recording sheet 8 comes to the position of the resist sensor 13, the conveyance of the recording sheet 8 is once stopped (S6 and S7). Energization for recording conforming to the image signal is effected to the recording head 5 to thereby form an ink image 2*a* on said ink layer. When simultaneously with the formation of said image, the leading end of said ink image 2*a* comes to the portion of pressure contact 30 between intermediate transfer the roller 6 and the transfer roller 7 via the intermediate transfer roller 6, the recording sheet 8 is conveyed in synchronism therewith so that the leading end edge of the recording sheet 8 comes to said portion of pressure contact 30, and the ink image 2*a* is transferred to the recording sheet 8 (S8 and S9).

Image recording for one page is effected by said step (S10), and if there is present the next page to record, return is made to step 6, where image recording of the next and subsequent pages is continued, and when the image recording is completed, the operation of the recording head is stopped, and the driving of the motors 23-26 is stopped (S11-S13) after the ink image is transferred to the recording sheet 8.

Here the image recording process will be described in greater detail. First, when the coating roller 4 is rotated in the direction of arrow E while the ink transport roller 1 is rotated in the direction of arrow A, the fluid ink 2 is applied as a layer to the surface of the ink transport roller 1 and is transported with the rotation of the ink transport roller 1.

The thus transported ink 2 has applied thereto a pattern-like voltage conforming to the image signal (in the present embodiment, a voltage of +15 V) from the recording head 5 controlled by the control system, at the energy applying position whereat the ink 2 contacts with the recording head 5. In conformity therewith, an electric current flows from the electrode portions 5*d* to the ink transport roller 1 through the ink 2, and the bridge structure is changed by the electro-chemical reaction in the ink 2 and there is formed an ink image 2*a* in which selective tackiness has been imparted to the ink 2.

The ink image 2*a* having the selective tackiness is further transported in the direction of arrow A from the portion of contact of the recording head 5, and this ink image 2*a* contacts with the intermediate transfer roller 6. Thereby, on the basis of said tackiness, the ink image is transferred to the intermediate transfer roller 6 rotated in the direction of arrow B, thereby forming the ink image 2*a* on the surface of the roller 6.

The ink image 2*a* transferred to the intermediate transfer roller 6 is conveyed with the rotation of the roller 6 and is urged against the recording sheet 8 conveyed to the ink image transfer position, whereby it is transferred to the recording sheet 8. The recording sheet 8 to which the ink image 2*a* has been transferred is discharged in the direction of arrow D. Where the fixativeness of the ink image 2*a* is not sufficient, conventional fixating means using, for example, heating or pressing may be provided downstream of the ink image transfer position for the recording sheet 8.

On the other hand, that part of the ink 2 transported by the ink transport roller 1 to which the energy is not applied and the part 2*ab* of the surface of said ink to which the energy has been applied are conveyed in the direction of arrow A without being transferred to the intermediate transfer roller 6, and are again contained in the ink reservoir 3 for reuse.

Even when the transfer and development are not complete as described above, the undeveloped ink 2*ab* is agitated in the ink reservoir 3 and returns to fluid ink having no tackiness. Accordingly, even if the ink 2 again contained in the ink reservoir 3 is repetitively used, ghost or the like will not occur.

In the recording apparatus of the present embodiment, as previously described, tackiness is imparted to the fluid ink 2 by the electro-chemical action caused by electrical energization, thereby effecting predetermined recording and therefore, it becomes possible to accomplish recording on plain paper or the like by small electrical energy and without the waste of the ink.

Also, the recording head 5 is biased by the pressing spring 11*b* and therefore, even if the recording head 5 is not precisely positioned when it is mounted on the apparatus, it becomes possible to cause the fore end portion of the recording head 5 to bear against the ink layer under an optimum bearing condition by adjusting the spring force of said spring and thus, assembly work becomes easy. Further, even if the thickness of the ink layer varies, the recording head 5 pivots about the shaft 11*a* and bears against the ink layer always under a predetermined bearing condition and therefore, stable image recording can be accomplished.

Also, the ink using the bridge structure does not require chemical color forming and therefore, as compared with the generally known electro-chemical recording method, i.e., the electrolytic recording method using color forming based on the oxidation-reduction reaction by electrical energization, image recording excellent in stability and durability of image can be accomplished.

Further, the conductivity of the ink 2 is provided by ion conduction, but as the electrolyte therefor, use can be made of ionic substances in a wide range (many solutions are transparent) and therefore, it can be easily accomplished to obtain ink of any color tone by a dye pigment or the like.

Another embodiment of the present invention will now be described with reference to FIGS. 10 to 14. In this embodiment, portions similar to those in the afore-described embodiment are given similar reference numerals and need not be described.

In the present embodiment, even if the thickness of the ink layer applied to the ink transport means varies, the flexible energy applying portion bears against the ink layer with elasticity, whereby said bearing condition does not vary and accurate energy application from the energy applying portion to the ink layer can be accomplished.

Figure 12:
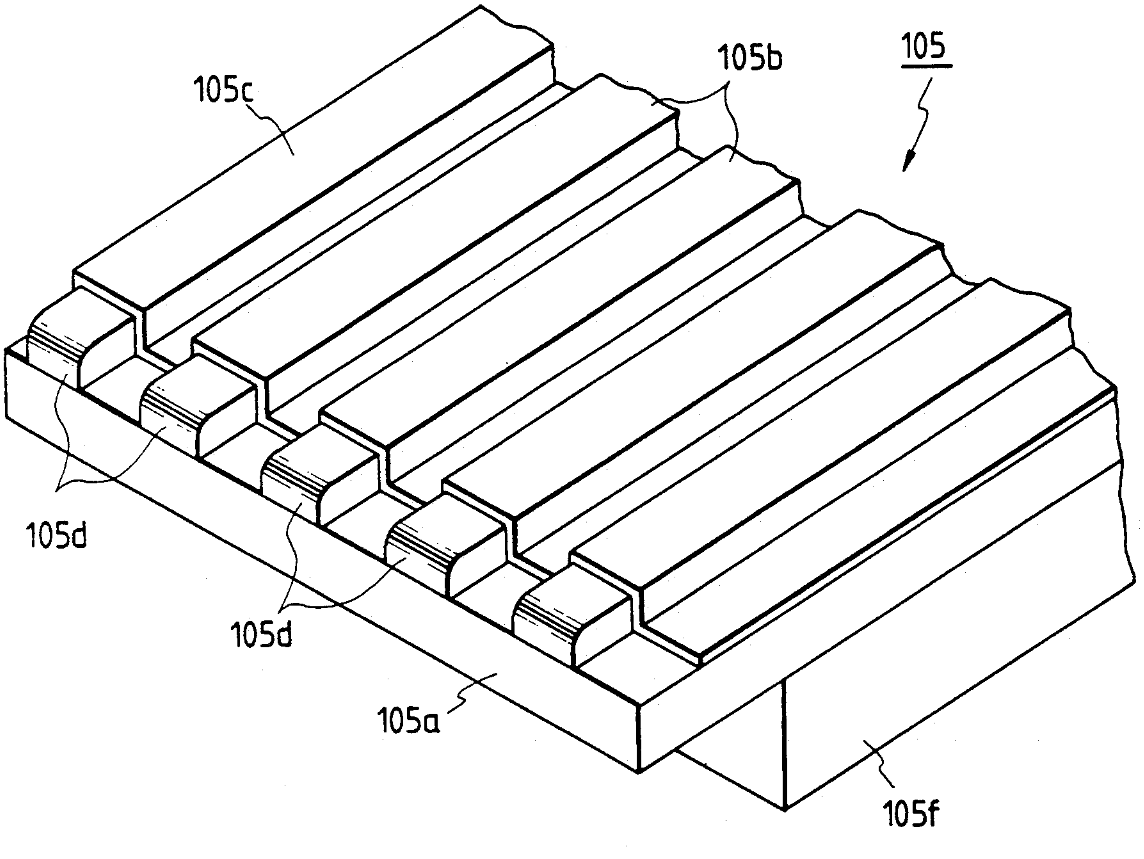
FIG. 12 illustrates the construction of a recording head.

Now, in the present embodiment, a recording head 105, as shown in FIG. 12, comprises a flexible head base member 105*a* and a plurality of electrodes 105*b* formed of an electrically conductive material such as copper and arranged in a row on the head base member 105*a*. An insulative film 105*c* formed, for example, of polyimide or the like is formed on the other portion of the electrodes 105*b* than the fore end portions thereof, i.e., the other portion than the portion which contacts the ink 2, thereby forming electrode portions (electrode end portions exposed from the insulative film) 105*d* on the fore end portions.

Figure 10:
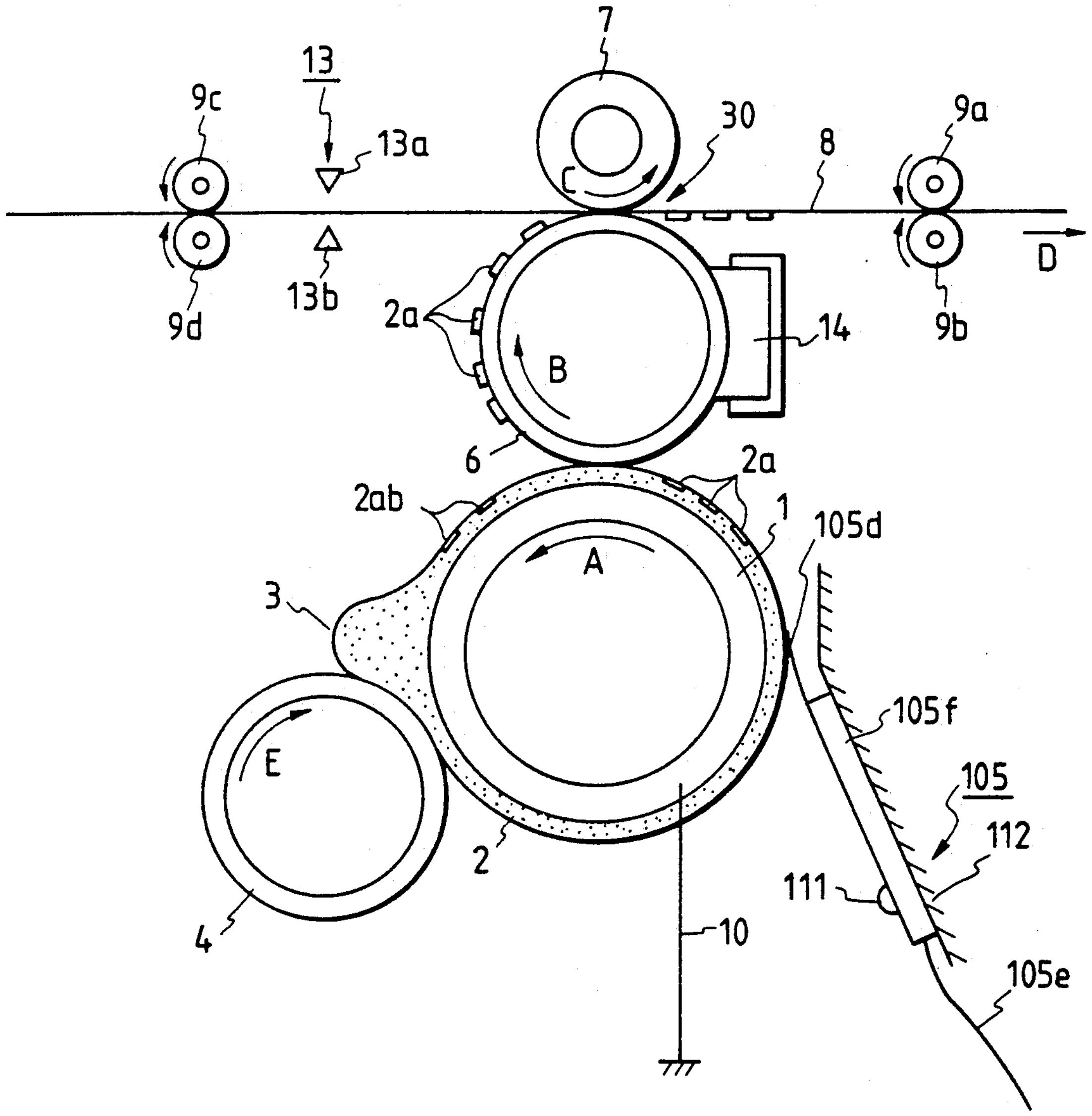
FIG. 10 is a cross-sectional view of a recording apparatus according to another embodiment of the present invention.
Figure 11:
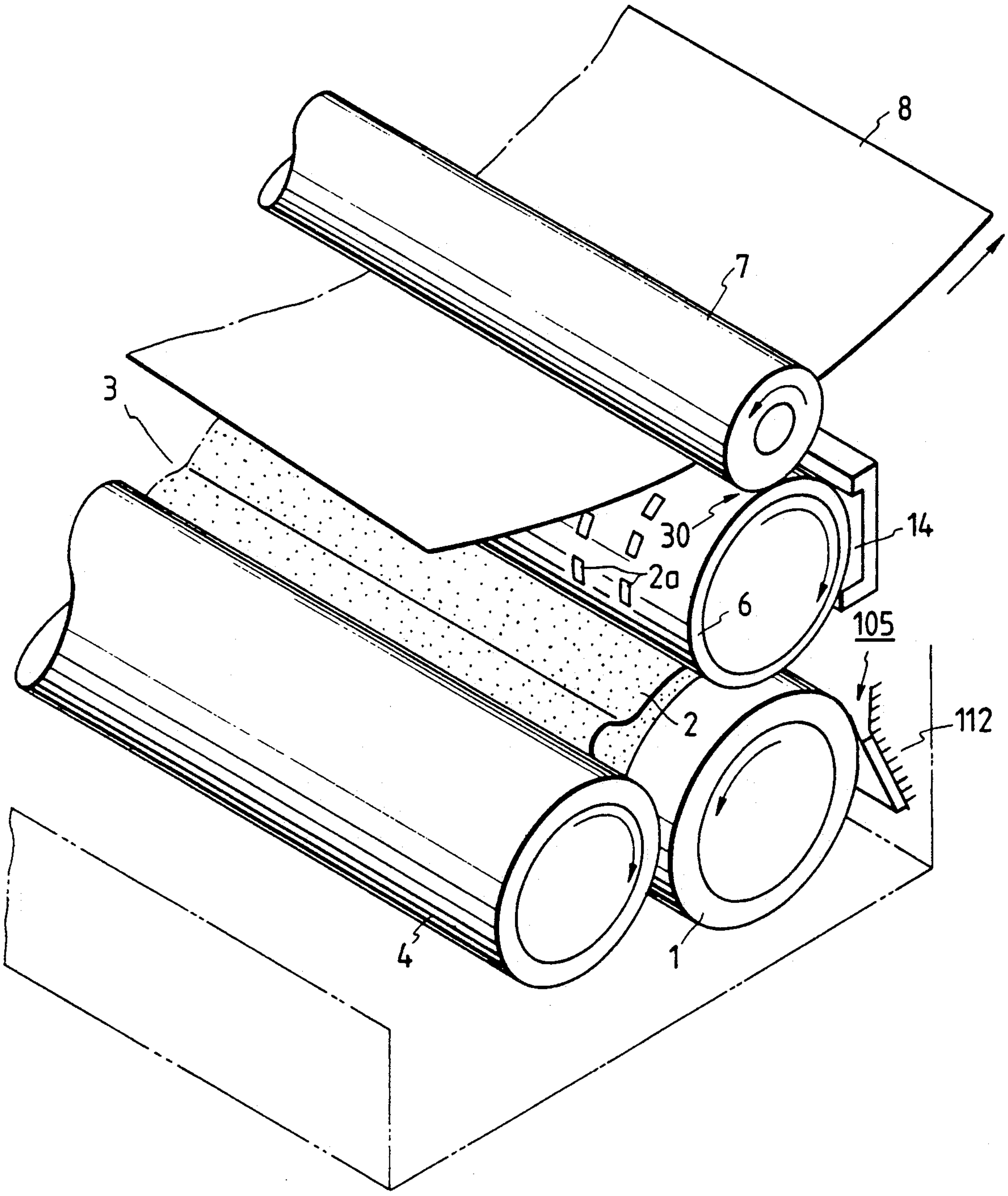
FIG. 11 is a perspective view of the FIG. 10 apparatus.

The energy application by the recording head 105, as shown in FIG. 10, is accomplished by electrically energizing the individual electrodes 105*b* in conformity with an image signal transmitted from a control system through a flexible signal cable 105*e*. Thus, the ink transport roller 1 grounded by the earth line 10 is electrically energized through the layer of the ink 2 which is in contact with the end electrode portions 105*d*, whereby electrical energy is applied to the layer of the ink 2.

The head base member 105*a* may preferably be formed of an insulative and flexible material, for example, a plastic film such as polyester or nylon, and in the present embodiment, it is formed of a polyimide film having a thickness of 0.2 mm, and a pattern electrode formed of copper and having a thickness of 18 $\mu$m is formed on the head base member 105*a*.

The end electrode portions 105*d* may preferably be plated with gold, platinum or rhodium, and more preferably be plated with platinum from the viewpoint of durability. Thus, in the present embodiment, the electrode portions 105*d* are plated with platinum to a thickness of 1–2 $\mu$m.

The head base member 105*a* is mounted on a head base plate 105*f* formed of a metal such as aluminum or iron or a plastic material, and the head base plate 105*f* if fixed to an apparatus frame 112 by means of a screw 111.

Figure 13:
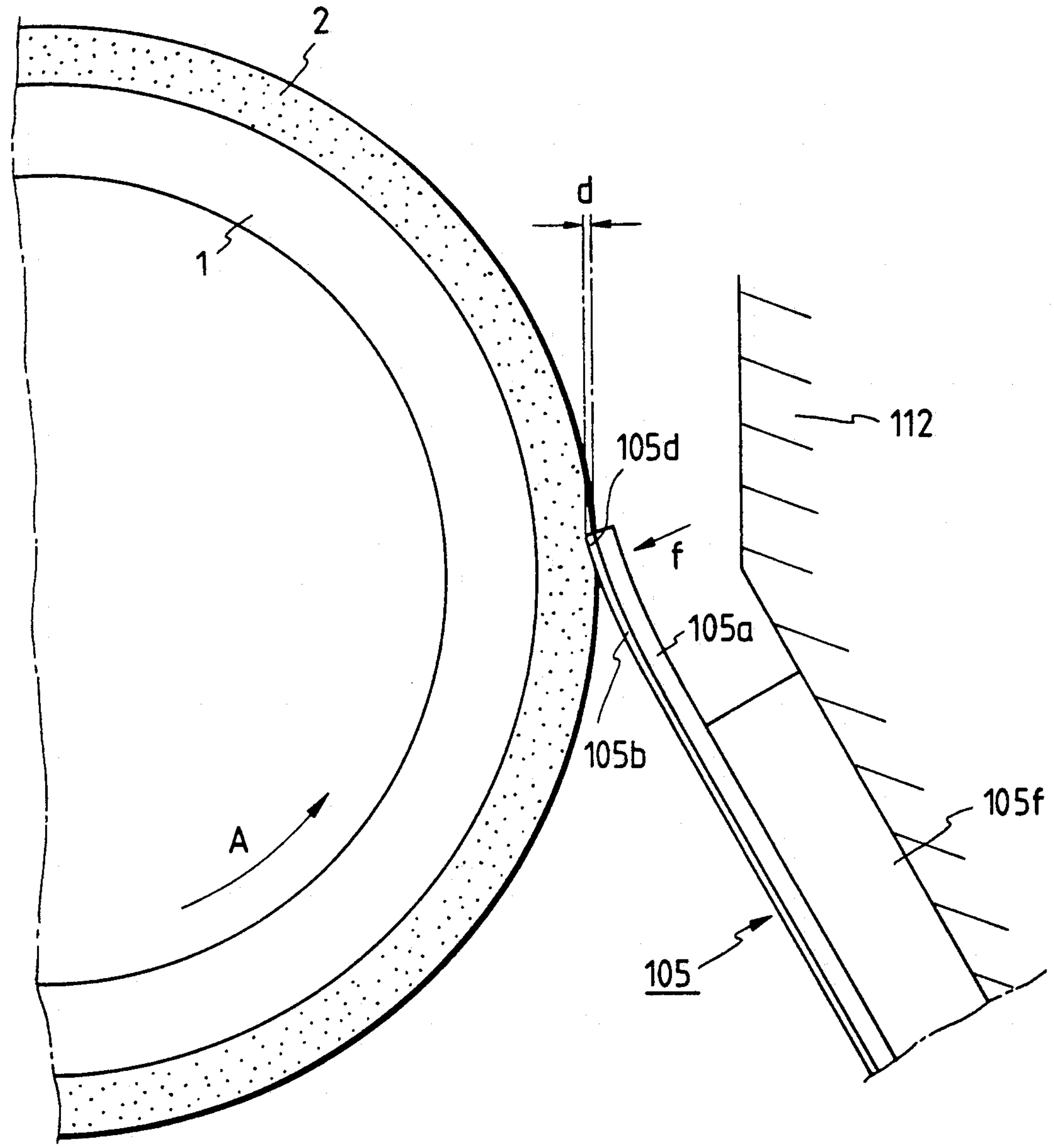
FIG. 13 illustrates a state in which the recording head bears against an ink layer.
Figure 14:
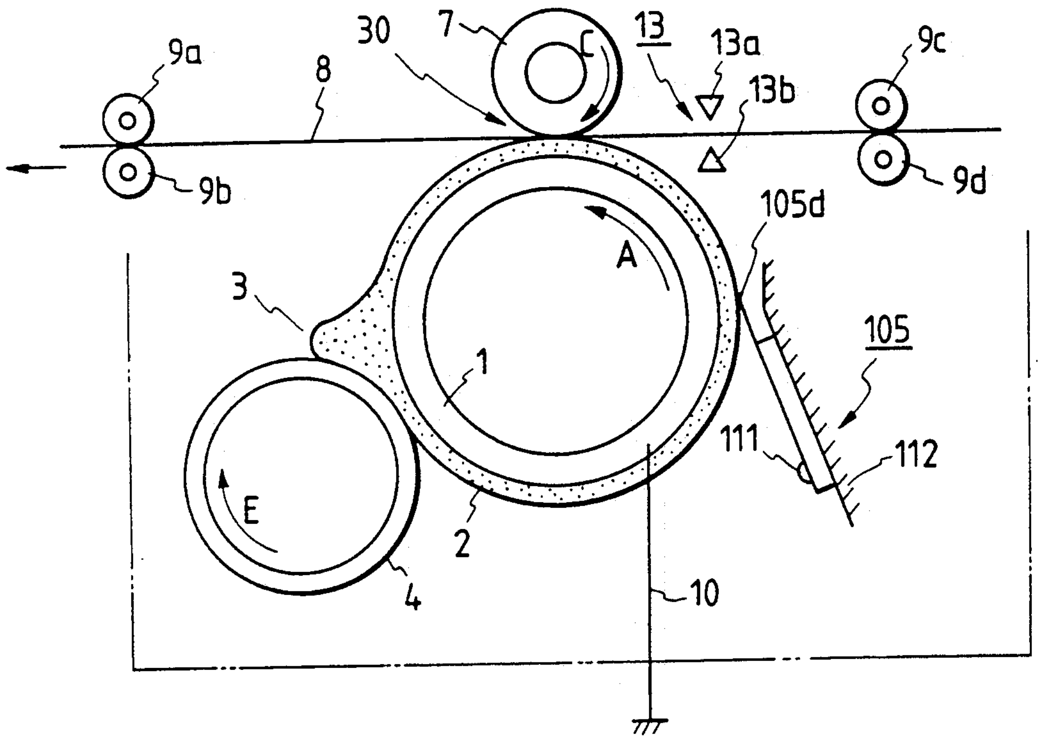
FIG. 14 illustrates an embodiment in which an intermediate transfer roller is not provided.
Figure 15:
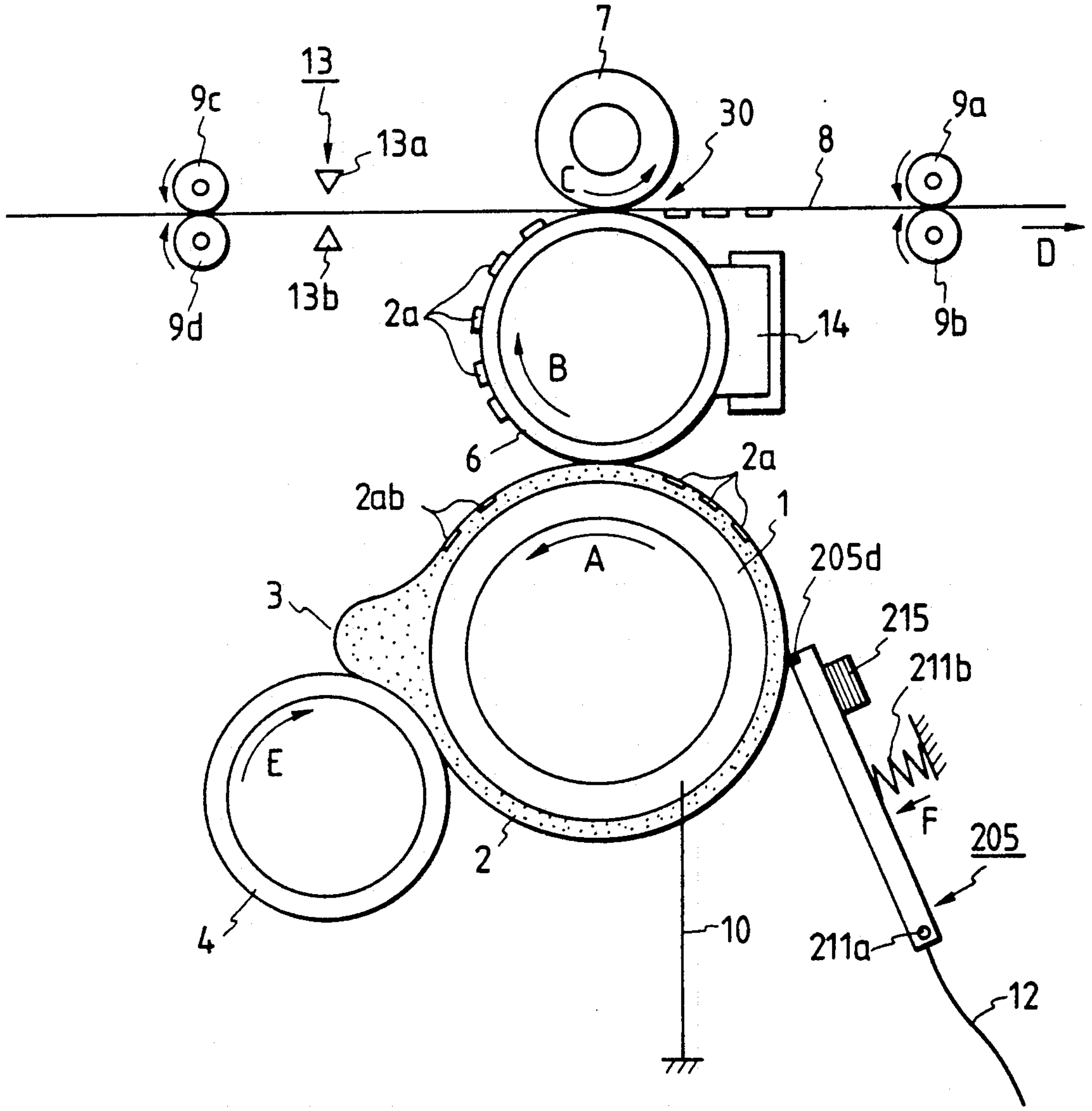
FIG. 15 a cross-sectional view of a recording apparatus according to another embodiment of the present envention.
Figure 16:
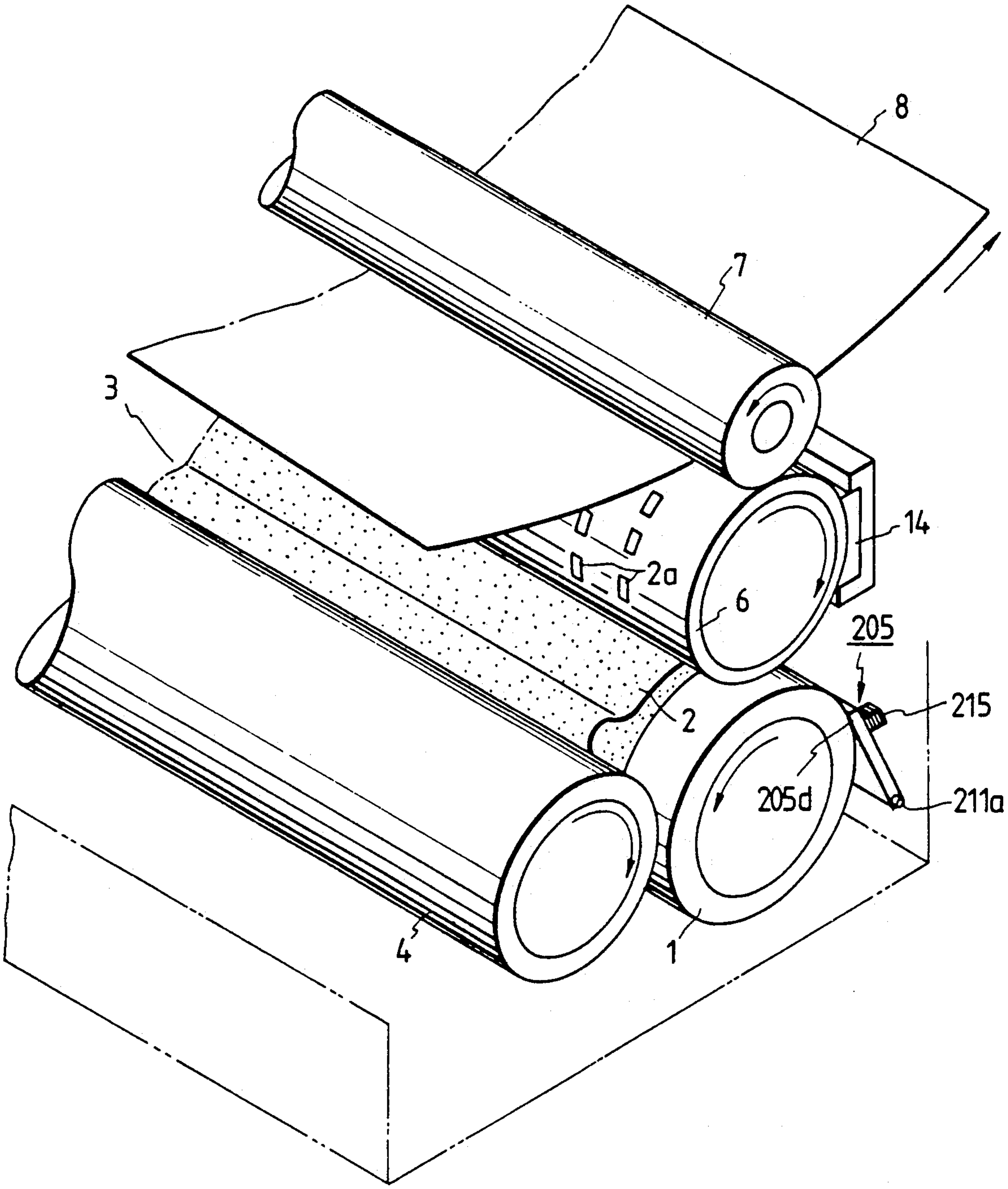
FIG. 16 is a perspective view of the FIG. 15 apparatus.
Figure 17:
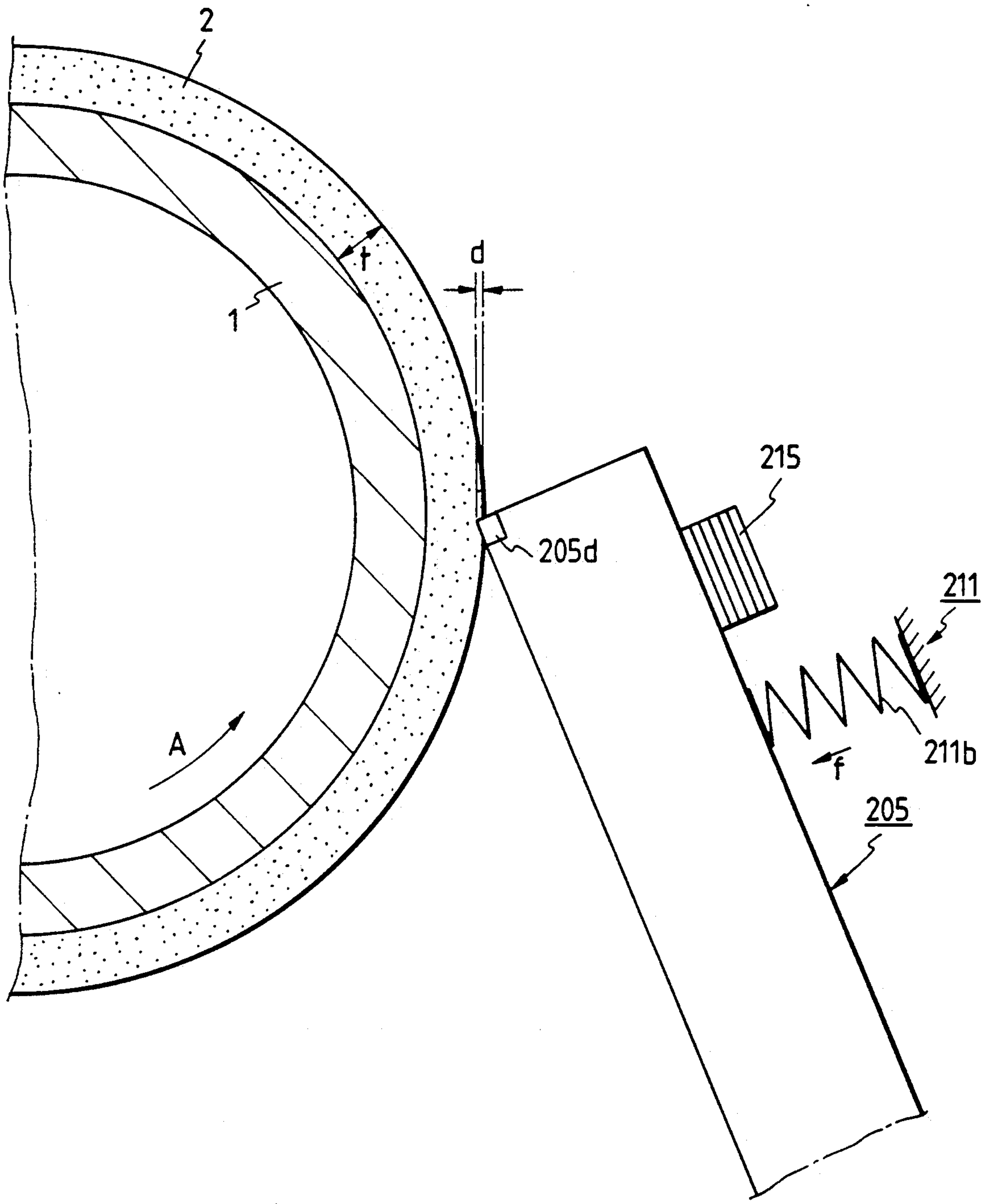
FIG. 17 illustrates a state in which the biased recording head bears against an ink layer.
Figure 18:
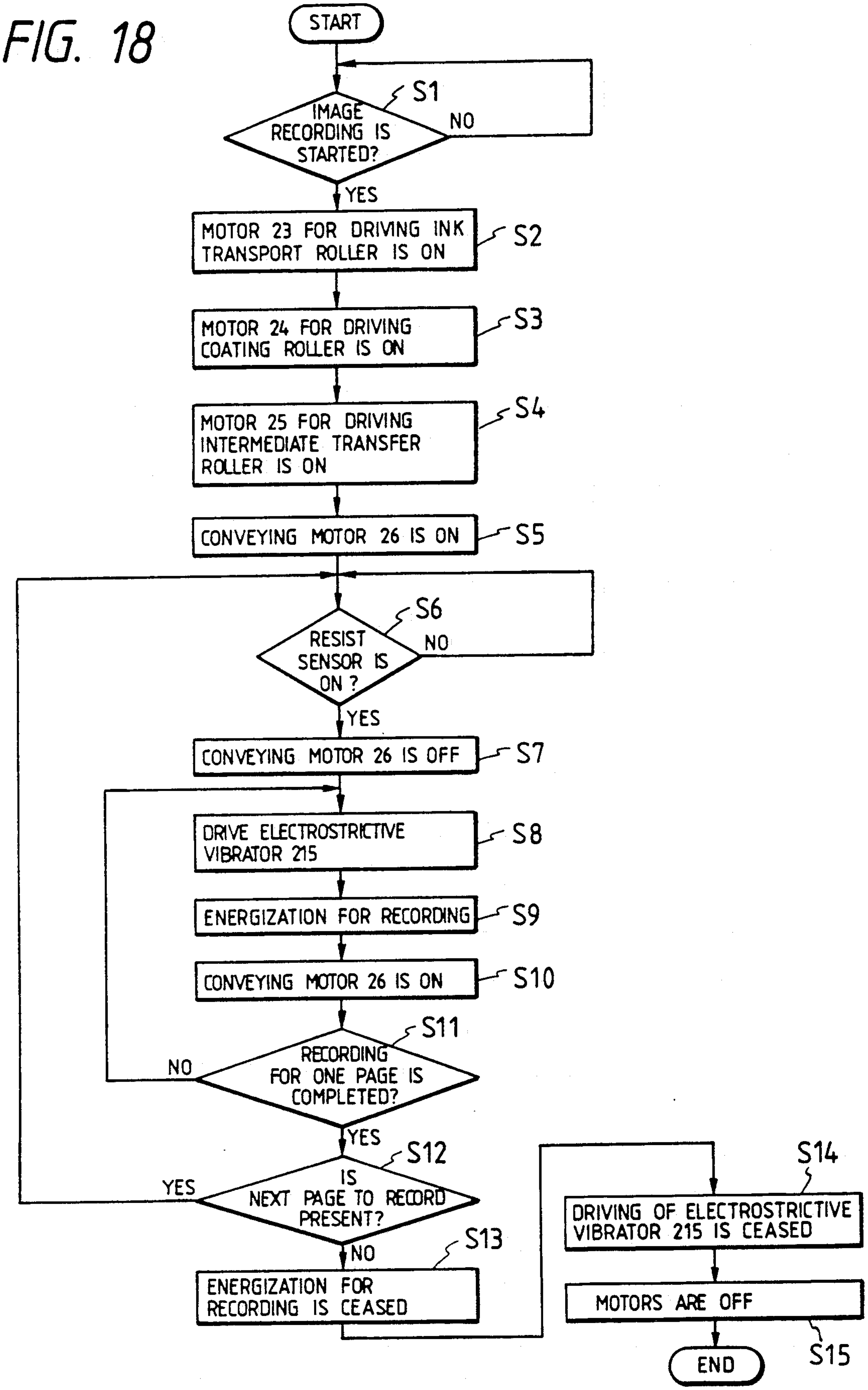
FIG. 18 is a flow chart of the operation.

When fixing the recording head 105, the recording head is mounted so that the head base member 105*a* somewhat flexes so as to ensure the end electrode portions 105*d* of the recording head 105 to reliably bear against the ink layer on the ink transport roller 1. Thereby, a biasing force is provided for the ink layer in conformity with the amount of flexure because the head base member 105*a* has flexibility. Accordingly, the end electrode portions 105*d*, as shown in FIG. 13, bears against the layer of the ink 2 with a biasing force f and enters into the ink layer having visco-elasticity by a depth d. The biasing force f is suitably set depending on the visco-elastic characteristic used and the thickness of the ink layer or the recording speed and electrical energization conditions, and if it is set so that said amount of entry d is of the order of 0–1 mm, preferably, of the order of 0–0.5 mm, the effect of electrical energization will be enhanced.

In the present embodiment, the recording head 105 having a length 21 cm is biased with 30 gf/cm ($30 \times 21 = 630$ gf) by flexing the head base member 105*a* by 0.5–1 mm, and the amount of entry d into the ink layer is set so as to be 0.05–0.1 mm.

The construction as described above in which the end electrode portions 105*d* are urged against the ink layer by the elastic force of the flexible member does not require a spring or the like and thus makes assembly easier, and the head base member 105*a* is also deformable relative to the lengthwise direction of the recording head 105. Therefore, even when there is irregularity of the layer thickness in the lengthwise direction of the ink layer (for example, when the thickness of the ink layer differs between the center and the ends of the lengthwise direction of the ink transport roller), the end electrode portions 105*d* uniformly bear against the ink layer. Accordingly, energy application is done well over the full lengthwise direction and clear-cut images are formed.

Here, the head base member 105*a* having flexibility may more practically be one generally used for FPC (flexible printed plate). Use may be made, for example, (a) a polyester film, (b) polyimide subjected to a special treatment (for example, made into multilayer structure), (c) a fluorine film, (d) a glass epoxy film, (e) polyamide unwoven fabric impregnated with epoxy resin, (f) an article formed of glass fiber and polyester resin or (g) alamide (heat-resisting nylon) paper, or a compound of said materials (a)–(g).

Alternatively, use may be made of a metallic base plate of aluminum, iron or an alloy (such as an aluminum alloy, stainless steel or phosphor bronze) having formed thereon an insulating layer on which electrodes are patterned. In this case, attachment to the head base plate will become unnecessary.

As described above, according to the present embodiment, the energy applying means can be resiliently biased toward the ink layer on the ink transport means without the use of a biasing member such as a spring, and this leads to the simplicity of structure and assembly, and even if there is irregularity of the layer thickness of the ink layer, the energy applying means accurately bears against the ink layer and therefore, energy application is accomplished accurately and it becomes possible to form clear-cut images.

Still another embodiment of the present invention will hereinafter be described with reference to FIGS. 15 to 20. In this embodiment, portions similar to those in the aforedescribed embodiment are given similar reference numerals and need not be described.

In the present embodiment, when applying energy with the energy applying means bearing against the ink layer applied to the ink transport means, if the energy applying means is minutely vibrated by vibrating means, the contact between the ink layer and the energy applying means takes place intermittently and it becomes difficult for the ink to adhere to the energy applying means and thus, cramp of the ink layer or trail of the ink image is eliminated.

Now, in the present embodiment, a recording head 205 is designed to be minutely vibrated by vibrating means during the formation of the ink image. That is, a Ranjuvan type electrostrictive vibrator 215 of about 10 W is attached to the base plate 205*a* side of the recording head 205, and by vibrating this vibrator 215, the electrode end portion 205*d* of the recording head 205 may be minutely vibrated in the direction of thickness of the ink layer. Thereby, the ink layer and the electrode end portion 205*d* of the recording head 205 repeat intermittent contact therebetween at a minute unit.

A control system for driving the various members of the recording apparatus will now be described briefly.

This control system, as shown in FIG. 6 already referred to, comprises a control unit 20 provided with a CPU 20*a* such as a microprocessor, an ROM 20*b* storing therein the control program of the CPU 20*a* and various data, and an RAM 20c used as the work area of the CPU 20a and temporarily preserving various data, an interface 21, an operation panel 22, a driver 27 for driving various motors (a motor 23 for driving the ink transport roller, a motor 24 for driving the coating roller, a motor 25 for driving the intermediate transfer roller, and a conveying motor 26 for driving the conveYing rollers) and the electrostrictive vibrator 215, a driver 28 for driving the recording head, and the electrostrictive vibrator 215.

The control unit 20 receives as inputs various kinds of information (such as recording density, number of records and size of record) from the operation panel 22 through the interface 21, and receives as inputs the signal from the resist sensor 13 and the image signals from the outer equipment 29. Also, the control unit 20 outputs motor ON-OFF signals for driving the motors 23–26, the vibration ON-OFF signal for the electrostrictive vibrator 21 and image signals through the interface 21, and drives various members by said signals.

The operation when recording is effected by the use of the recording apparatus of the above-described construction will now be described with reference to the flow chart of FIG. 8.

When a recording start signal is input by a recording start switch or the like (S1), the motors 23–26 are driven to rotate the ink transport roller 1, the coating roller 4, the intermediate transfer roller 6 and the conveying rollers 9a–9d in the directions of arrows, respectively, in FIG. 1, whereby the ink transport roller 1 is coated with an ink layer and the recording sheet 8 is conveyed (S2-S5).

Next, when the leading end edge of the recording sheet 8 comes to the position of the resist sensor 13, the conveyance of the recording sheet 8 is once stopped (S6 and S7). The electrostrictive vibrator 215 is then driven to minutely vibrate the recording head and at the same time, energization for recording conforming to the image signal is effected to the recording head 205, whereby an ink image 2a is formed on the ink layer. Further, when simultaneously with the formation of said image, the leading end of the ink image 2a comes to the portion of pressure contact between the intermediate transfer roller 6 and the transfer roller 7 via the intermediate transfer roller 6, the recording sheet 8 is conveyed in synchronism therewith so that the leading end edge of the recording sheet 8 comes to said portion of pressure contact, and the ink image 2a is transferred to the recording sheet 8 (S8–S10).

Here the image recording process will be described in greater detail. First, when the coating roller 4 is rotated in the direction of arrow E while the ink transport roller 1 is rotated in the direction of arrow A, the fluid ink 2 is applied as a layer to the surface of the ink transport roller 1 and is transported with the rotation of the ink transport roller 1.

The ink 2 thus transported has applied thereto a pattern-like voltage conforming to the image signal (in the present embodiment, a voltage of +15 V) from the recording head 205 controlled by the control system, at the energy applying position whereat the ink 2 contacts with the recording head 205, and in conformity therewith, an electric current flows from the electrode end portion 205d to the ink transport roller 1 through the ink 2, and the bridge structure is changed by the electrochemical reaction in the ink 2, whereby there is formed an ink image 2a in which selective tackiness is imparted to the ink 2. At this time, by the electrode end portion 205d being minutely vibrated (for example, at a resonance frequency 30 KHz and amplitude 13 μm) by the driving of the electrostrictive vibrator 215, the contact between the ink layer and the recording head 205 takes place intermittently at a minute unit. Therefore, the ink image 2a having been endowed with tackiness by said electrical energization is not rubbed by the recording head 205, and trail of the ink image 2a or cramp of the ink layer, and further, occurrence of vibration which will affect the image formation by sticking and slip (repetition of the adherence and seperation between the ink layer and the recording head 205) are prevented.

Now, image recording for one page is effected by the aforedescribed process (S11), and if there is present the next page to record, return is made to step S6, where recording for the next and subsequent pages is continued, and when image recording is completed, the operation of the recording head 205 and the driving of the electrostrictive vibrator 215 are ceased and after the ink image is transferred to the recording sheet 8, the driving of the motors 23–26 is ceased (S12–S15).

In the present embodiment, the recording head 205 itself is designed to be vibrated, but alternatively, as shown in FIG. 19, a square plate type electrostrictive vibrator 216 may be provided between a head base 205f comprising an aluminum plate and a ceramic substrate 205g on which electrodes 205b are formed, and only the ceramic substrate 205g of smaller inertial weight may be vibrated. If this is done, it will become possible to reduce the energy for causing vibration.

Further, in the present embodiment, the direction of vibration of the recording head 205 is the direction of thickness of the ink layer, whereas this is not restrictive, but the recording head may be vibrated, for example, in the direction of movement of the ink layer or the main scanning direction (the lengthwise direction) of the recording head 205 to obtain a similar effect. Further, a combination of these vibration modes may be adopted. The above-described various vibration modes can be readily achieved by changing the type of the vibrator or the manner in which it is mounted.

The vibration generating means need not be restricted to the electrostrictive vibrator in the aforedescribed embodiment, but may of course be, for example, a construction comprising a voice coil and a magnet, or a construction using the rotation of a cam mechanism, an eccentric rotor or the like.

As described previously, according to the present embodiment, the energy applying means is minutely vibrated by the vibrating means, whereby cramp of the ink layer and trail of the ink image and further, sticking and slip can be prevented and clear-cut images can be obtained stably.

Another embodiment of the present invention will now be described with reference to FIGS. 21 to 29. In this embodiment, portions similar to those in the previous embodiments are given similar reference numerals and need not be described.

The present embodiment is such that during non-recording, the energy applying means is spaced apart from the ink on the ink transport means by contacting and spacing means, thereby protecting the energy applying means and preventing unnecessary adherence of the ink to the energy applying means.

Figure 23A:
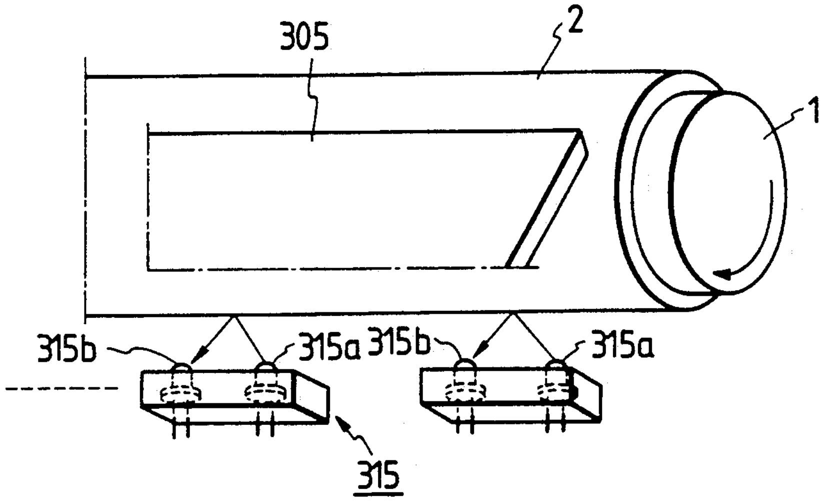
FIGS. 23A, 23B and 23C illustrate detecting means for detecting the coating condition.
Figure 23B:
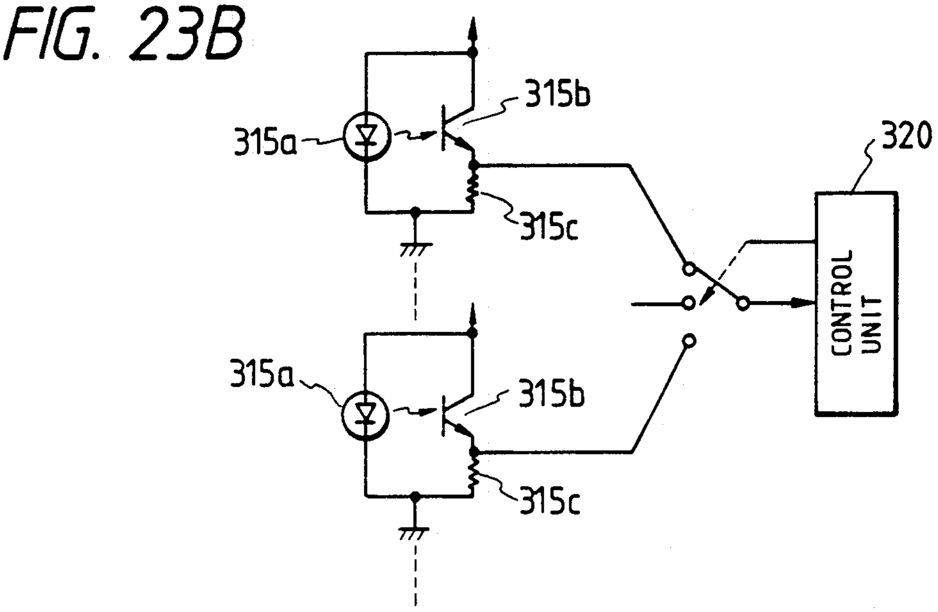

First, in the present embodiment, whether the ink transport roller 1 has been coated with the ink 2 to a predetermined thickness is detected by detecting means 315. The construction of this detecting means 315 will now be described. As shown in FIGS. 23A and 23B, a plurality of photocouplers 315 each comprising an LED 315*a* and a phototransistor 315*b* are arranged axially of the ink transport roller 1. The terminal voltages of resistors 315*a* connected to the respective phototransistors 315*b* are detected and the respective terminal voltages are time-divisionally output as an output voltage to the analog terminal of CPU which will be described later.

Figure 23C:
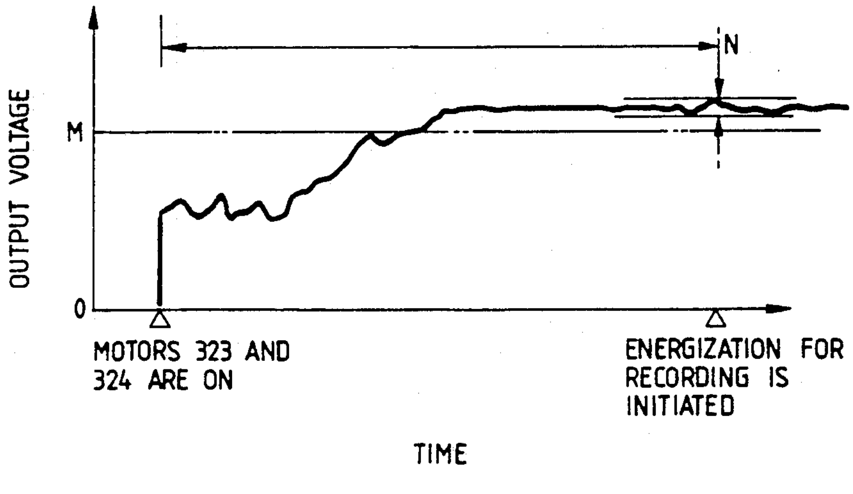

The output from the photocouplers 315 differs depending on whether the surface of the ink transport roller 1 is coated with the ink 2 to a predetermined thickness. Accordingly, by detecting said output voltage, the coated state of the ink transport roller 1 with the ink 2 can be detected. That is, the light of the LED's 315*a* is applied toward the ink transport roller 1, but when the surface of the roller 1 is not coated with the ink 2, the light reflected by the surface of the ink transport roller 1 deviates from the usual optical path and therefore, the amount of light incident on the phototransistors 315*b* is small and said output voltage is low. As the surface of the ink transport roller 1 is coated with the ink 2, the amount of light incident on the phototransistors 315*b* increases and the output voltage rises. So, as shown in FIG. 23C, the output voltage (hereinafter referred to as the "predetermined value") M when the surface of the ink transport roller 1 is coated with the ink 2 to a predetermined thickness or the range of the output voltage (hereinafter referred to as the "predetermined range") N when the thickness of said ink layer is within a predetermined range is set in said control unit, and by comparing the output voltage with said values M and N, whether the coating state of the ink 2 is good over the axial direction of the ink transport roller 1 may be detected.

Description will now be made of contacting and spacing means 316 for contacting the recording head 305 with the ink layer on the ink transport roller 1 and spacing the recording head 305 apart from said ink layer. This contacting and spacing means 316 is comprised of biasing means 311 and spacing means 317 for the recording head 305.

Figure 21:
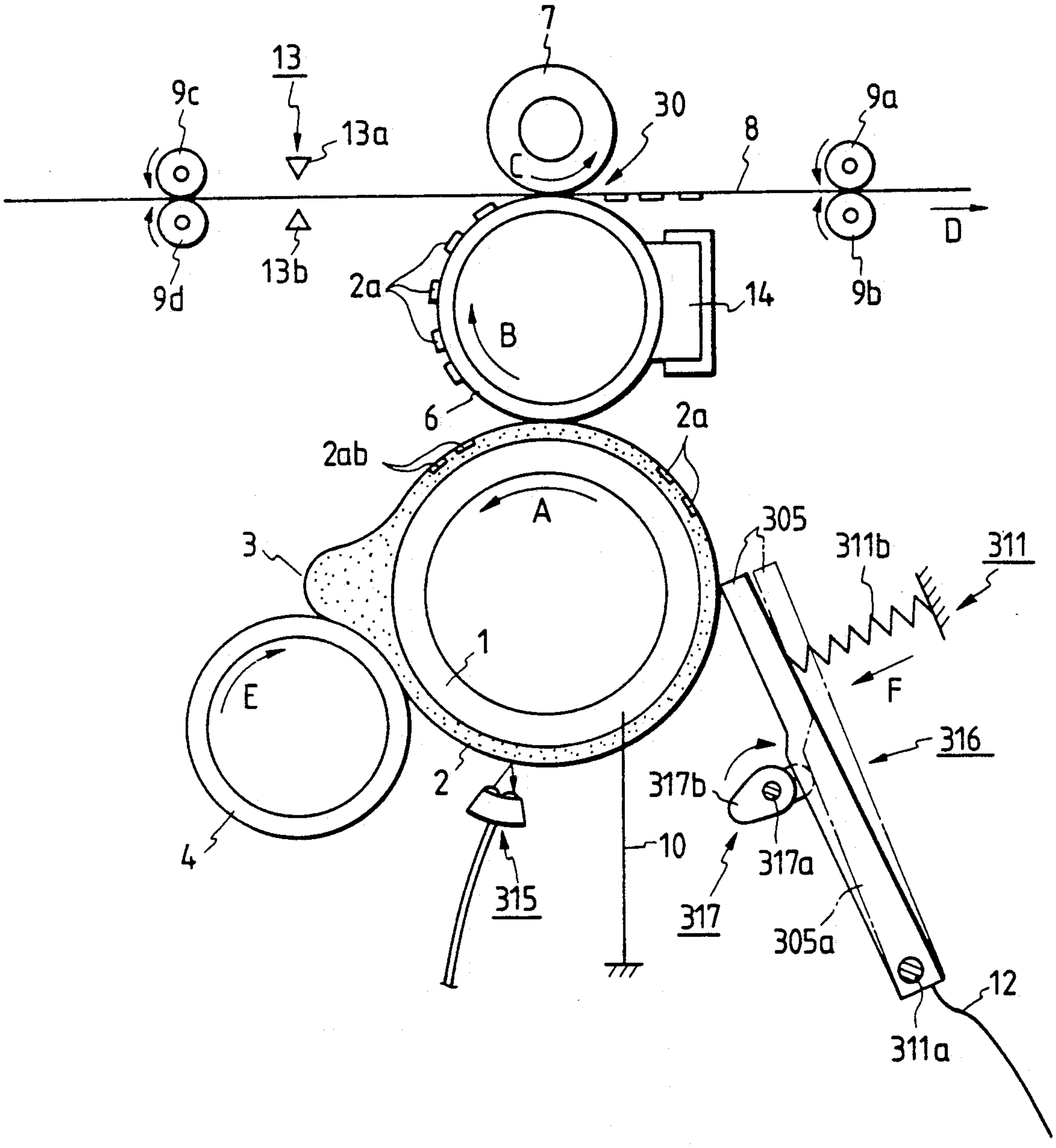
FIG. 21 is a cross-sectional view of an image recording apparatus according to another embodiment of the present invention.
Figure 24:
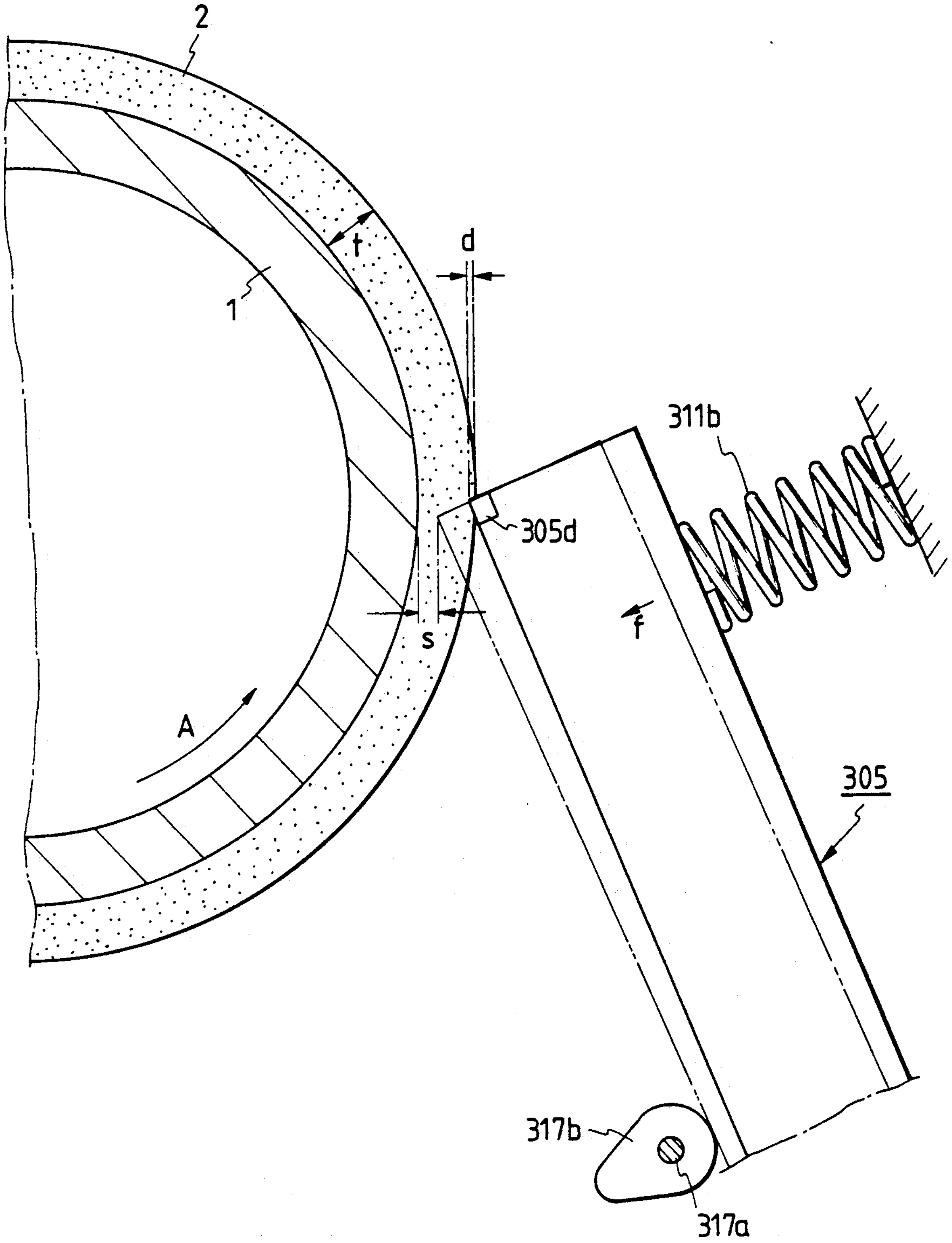
FIG. 24 illustrates a state in which the biased recording head bears against an ink layer.

The construction will be described more specifically. First, the construction of the biasing means 311 for the recording head 305 is such that as shown in FIG. 21, the base portion of the recording head 305 is mounted for pivotal movement about a shaft 311*a* and the fore end portion of the head is biased in the direction of arrow F, i.e., toward the ink transport roller 1, with a predetermined biasing force by a pressing spring 311. Thus, the electrode element 305*d*, as shown in FIG. 24, contacts with the ink layer 2 with a biasing force f and enters into the visco-elastic ink layer by a depth d. The biasing force f can be suitably set depending on the visco-elastic characteristic of the ink 2 used and the thickness of the ink layer or the recording speed and the electrical energization conditions, but it is preferable in enhancing the effect of electrical energization to set the biasing force f so that said amount of entry is of the order of 0–1 mm, and preferably about 0–0.5 mm.

In the present embodiment, the recording head 305 having, for example, a length of 21 cm is biased with 30 g/cm ($30\times21=630$ g) by the pressing spring 311*b* and the biasing force is set so that the amount of entry into the ink layer is 0.05–0.1 mm.

Here, description will be made of the amount of electrical energization when recording is effected by the recording head 305 which is accurately brought into contact with the ink layer applied onto the ink transport roller 1, by the biasing means 311. Where, for example, polyvinyl alcohol bridged by ion borate is used as the bridge structure of the ink 2, the amount of electrical energization may be an amount of electrical energization required to cause an electro-chemcial change in this ink 2. Said amount of electrical energization, as compared with the amount of electrical energization when, for example, in heat transfer or the like, heat energy is applied by a thermal head, provides the ink 2 with tackiness by the application of low energy of about 1/10.

Figure 22:
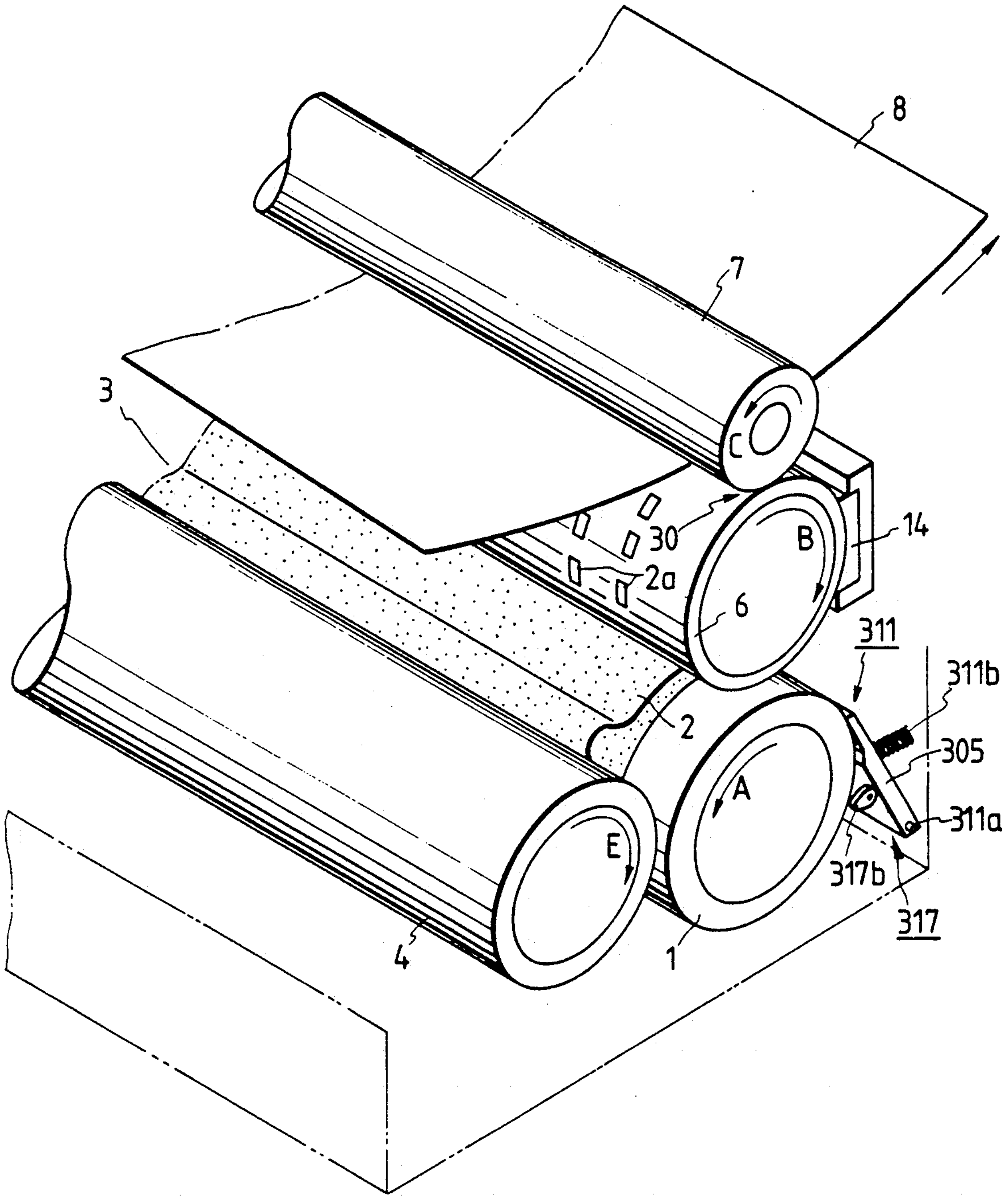
FIG. 22 is a perspective view of the FIG. 21 apparatus.
Figure 25:
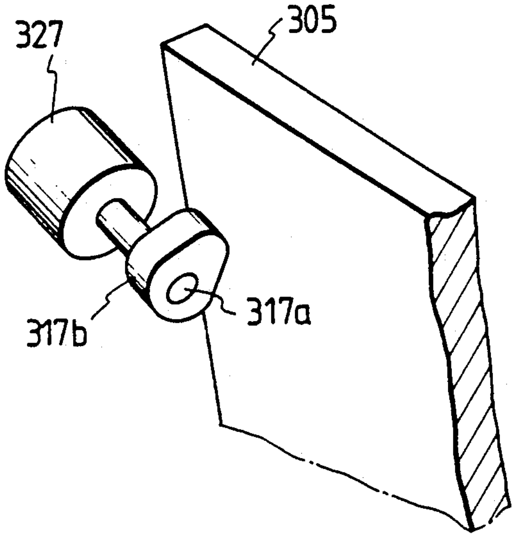
FIG. 25 illustrates the construction of spacing means for the recording head.

The spacing means 317 for spacing the recording head 305 apart from the ink layer, as shown in FIGS. 21, 22 and 25, comprises a pivotable can 317*b* pivotable about a shaft 317*a* by a cam motor 327 and disposed so as to be capable of bearing against that side of the recording head 305 which is opposite to the base plate 305*a* thereof. Accordingly, when the pivotable can 317*b* is in the solid-line position of FIG. 21, the recording head 305 contacts with the ink layer applied to the ink transport roller 1 and thus, electrical energization is possible. Also, when the pivotable cam 317 pivots to the dot-and-dash line position of FIG. 21, the recording head 305 moves in the direction opposite to the direction of arrow F against the force of the pressing spring 311*b*, and is spaced apart from the ink layer on the ink transport roller 1.

Also, when as previously described, the recording head 305 is biased toward the ink transport roller 1, it is conceivable in a state in which the ink transport roller 1 is not coated with the ink 2 that the electrode element 305*d* directly contacts with the ink transport roller 1 and is thereby broken off. It is further conceivable that when electrical energization is effected during recording, an excessively great current flows from the electrode element 305*d* directly to the ink transport roller 1, whereby the electrode element 305*d* is melted or the electrode driving circuit is destroyed. So, to eliminate such inconvenience, it is preferable to provide controlling means for preventing the recording head 305 from directly contacting with the ink transport roller 1.

In the present embodiment, as shown in FIG. 24, the pivotable cam 317*b* in the spacing means for the recording head 305 is utilized as the controlling means. That is, when no ink layer is formed on the ink transport roller 1, the recording head 305 biased by the spring 311*b* bears against the pivotable cam 317*b* so that the electrode element 305*b* may not directly contact with the ink transport roller 1. More specifically, design is made such that the gap s between the surface of the ink transport roller 1 and the fore end portion of the recording head 305 is of the order of 0.5 mm when the recording head 305 bears against the pivotable cam 317*b*.

A control system for driving the various members of the recording apparatus will now be described briefly.

Figure 26:
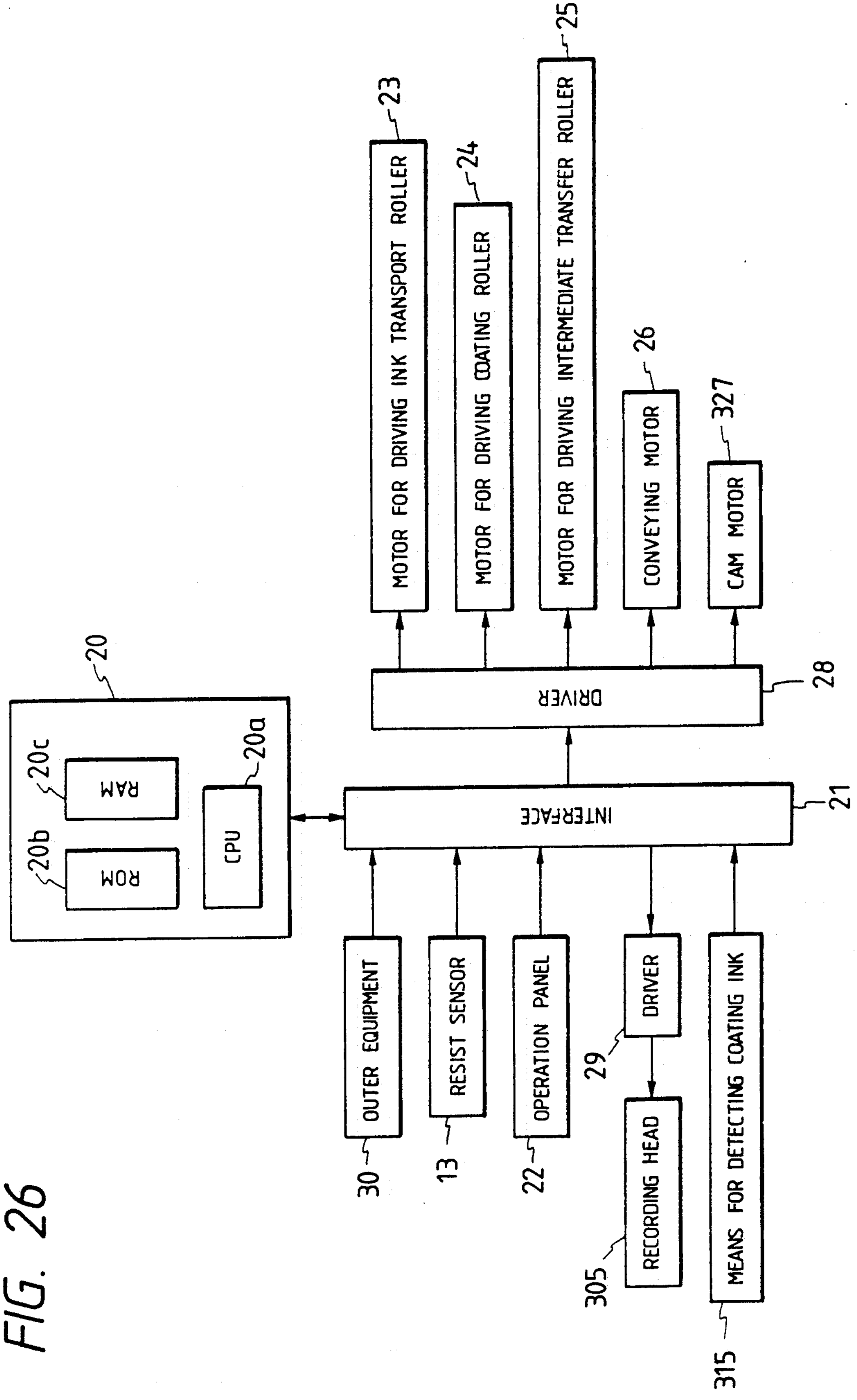
FIG. 26 is a block diagram of a driving control system.

This control system, as shown in FIG. 26, comprises a control unit 20 provided with a CPU 20*a* such as a microprocessor, an ROM 20*b* storing therein the control program of the CPU 20*a* and various data, and an RAM 20*c* used as the work area of the CPU 20*a* and temporarily preserving various data, an interface 21, an operation panel 22, a driver 28 for driving various motors (a motor 23 for driving the ink transport roller, a motor 24 for driving the coating roller, a motor 25 for driving the intermediate transfer roller, a conveying motor 26 for driving the conveying rollers, and a cam motor 327), and a head driving control unit 29.

The control unit 20 receives as inputs various kinds of information (such as recording density, number of records and size of record) from the operation panel 22 through the interface 21, and receives as inputs the signal from the resist sensor 13 and the image signals from the outer equipment 30. Also, the control unit 20 outputs motor ON-OFF signals for driving the motors 23–26 and the cam motor 327 and image signals through the interface 21, and drives the various members by said signals.

Figure 27:
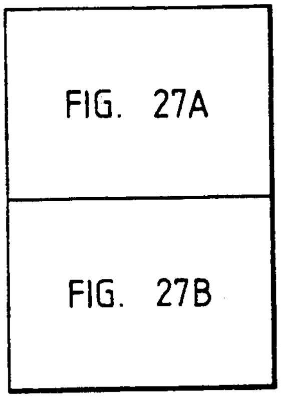
FIG. 27 is a flow chart of the operation.
Figure 27A:
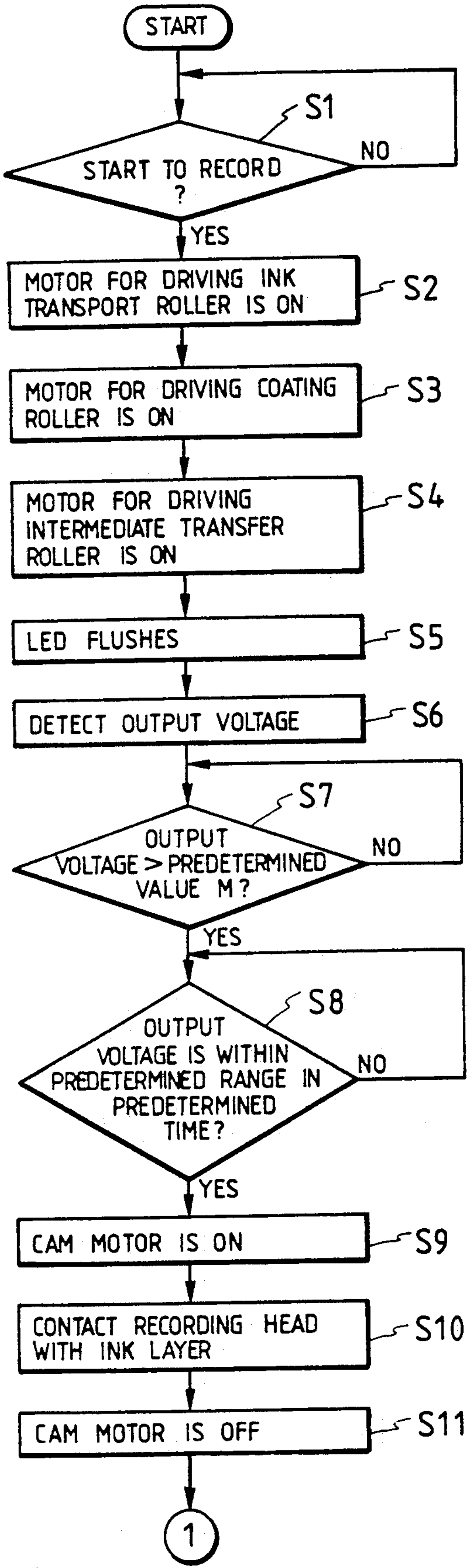
Figure 27B:
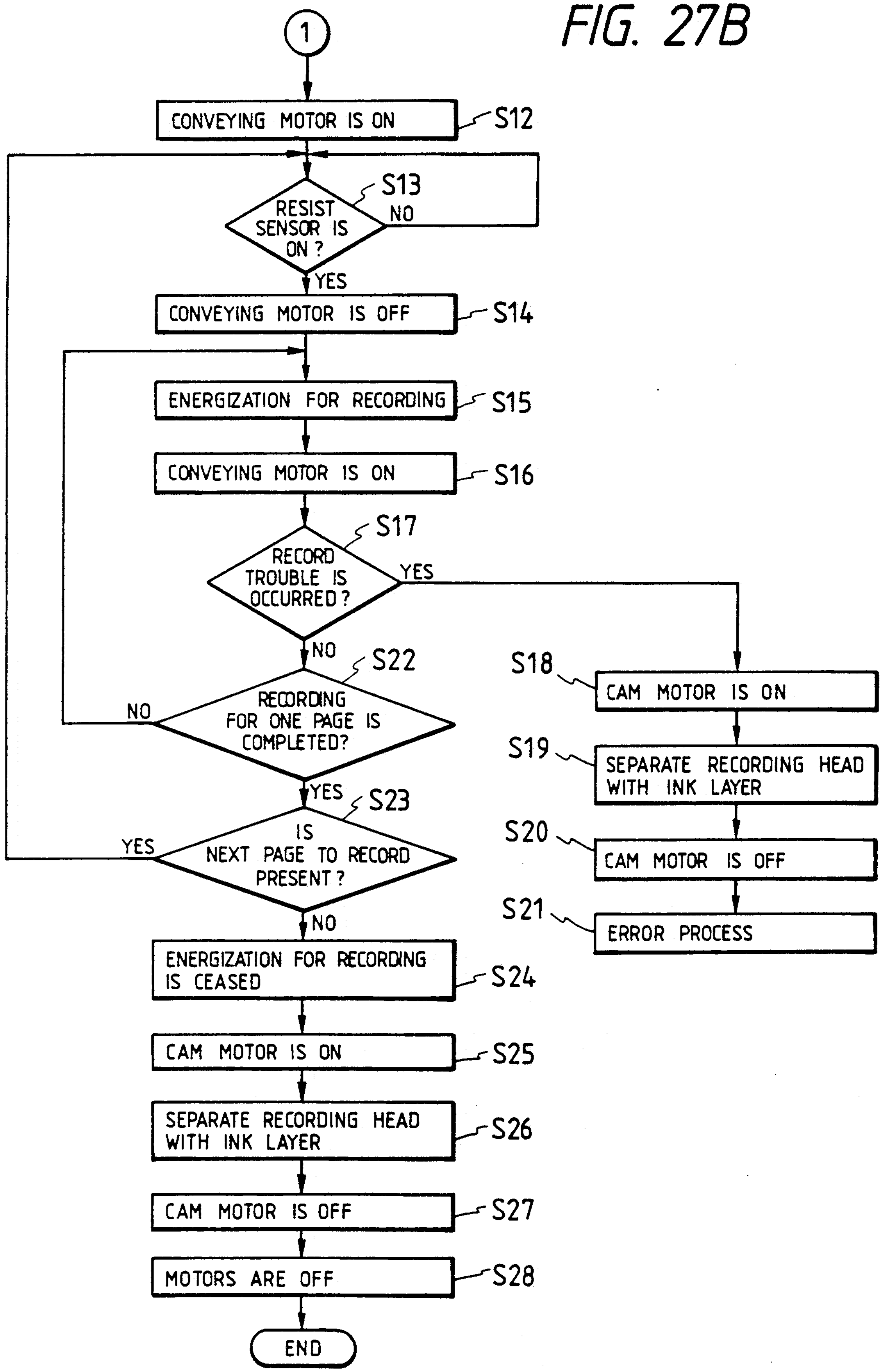
Figure 29:
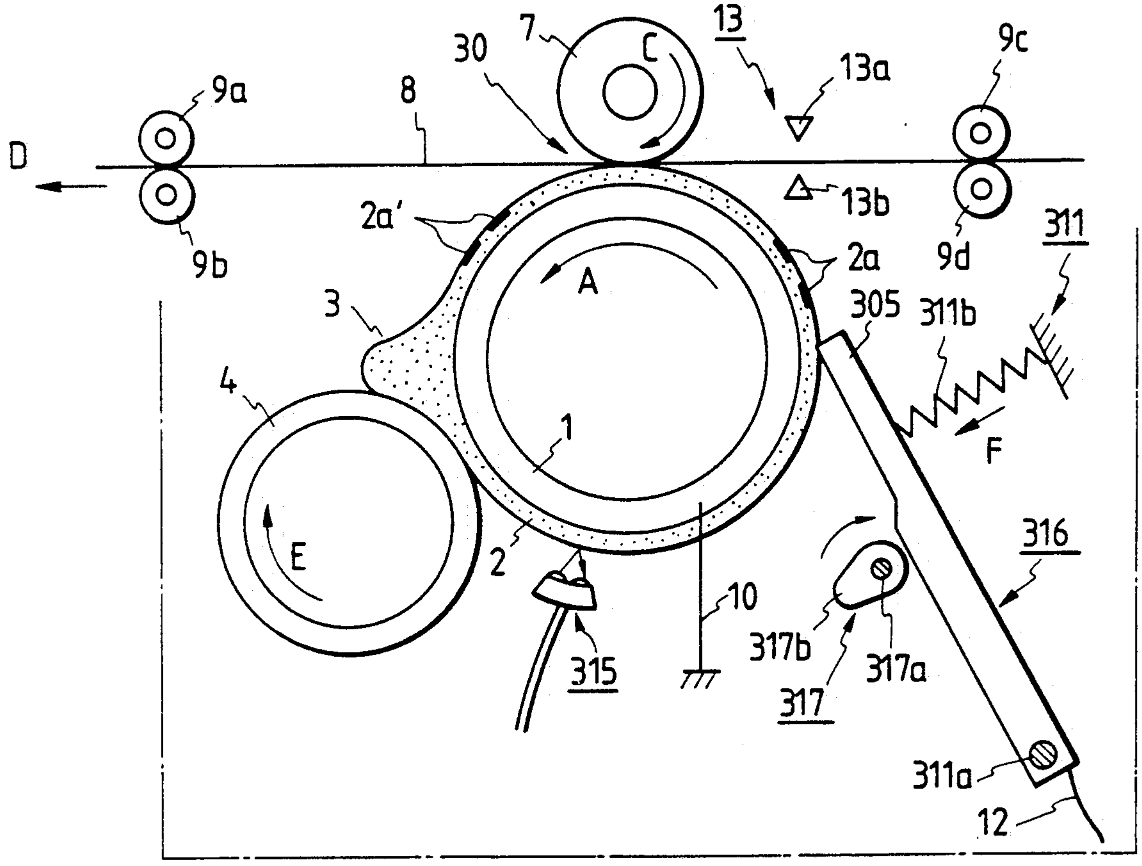
FIG. 29 illustrates an embodiment in which an intermediate transfer roller is not provided.

The operation when recording is effected by the use of the recording apparatus of the aforedescribed construction will now be described with reference to the flow chart of FIG. 27.

When a recording start signal is input by a recording start switch or the like (S1), the motors 23–25 are driven to rotate the ink transport roller 1, the coating roller 4 and the intermediate transfer roller 6 in the directions of arrows, respectively, in FIG. 1, and the ink transport roller 1 is coated with an ink layer (S2–S4).

Simultaneously with said coating, light is applied from the LED's 315*a*, and an output voltage conforming to the coated state is detected, and whether the output voltage is higher than the predetermined value M is detected (S5–S7). When said output voltage is higher than the predetermined value M, it means a state in which the surface of the ink transport roller 1 has been coated with the ink 2 to a predetermined thickness. Accordingly, electrical energization for recording may be started in this state, but for example, if the apparatus has been stopped for a long time in said coated state, the fluid ink 2 applied as the coating to the ink transport roller 1 may sometimes hang down from gravity and the ink layer may partially be thick below the roller 1. So, in the present embodiment, the coated state is further continued and whether said output voltage is within the predetermined range N for a predetermined time is detected (S8).

After it is detected by said operation that the whole surface of the ink transport roller 1 has been uniformly coated with the ink layer to a predetermined thickness, the cam motor 327 is driven to cause the recording head 305 to bear against the applied ink layer (S9–S11), and the image formation on the ink layer is started by electrical energization for recording, and the recording step of transferring the image to the recording sheet 8 is started.

That is, the recording sheet 8 is first conveyed, and at a point of time whereat the leading end edge of recording sheet 8 has come to the position of the resist sensor 13, the conveyance of the recording sheet 8 is once stopped (S12–S14). Electrical energization for recording conforming to the image signal is effected to the recording head 305 to thereby form an ink image 2*a* on the ink layer, and the recording sheet 8 is synchronously conveyed so that when simultaneously with the formation of said image, the leading end of said ink image 2*a* comes to the portion of pressure contact between the intermediate transfer roller 6 and the transfer roller 7 via the intermediate transfer roller 6, the leading end edge of the recording sheet 8 comes to said portion of pressure contact, and the ink image 2*a* is transferred to the recording sheet 9 (S15 and S16).

When abnormality such as jamming of the recording sheet 8 occurs during said recording (S17), the cam motor 327 is driven to space the recording head 305 apart from the ink layer (S18–S20), and error processing is carried out (S21).

Recording for one page is effected by said step (S22), and when there is present the next page to record, return is made to step S13, where recording for the next and subsequent pages is continued (S23), and when the recording is completed electrical energization of the recording head is ceased (S24) and the cam motor 327 is driven to space the recording head 305 apart from the ink layer (S25–S27), and further the ink image is transferred to the recording sheet 8, and the recording sheet 8 is discharged, whereafter the driving of the motors 23–26 is ceased (S28).

As described above, according to the present embodiment, during non-recording, the recording head 305 is spaced apart from the ink layer on the ink transport roller 1, whereby the recording head 305 can be prevented from being unnecessarily abraded and thus, the recording head 305 can be protected and adherence of the ink to the recording head 305 can be prevented.

Figure 28:
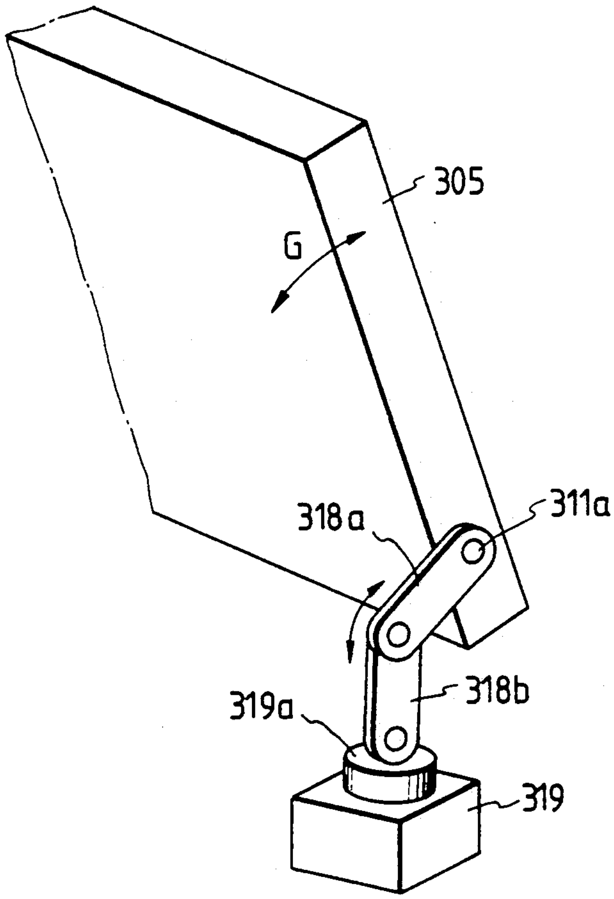
FIG. 28 illustrates another embodiment of contacting and spacing means.

In the present embodiment, the recording head 305 is biased to the ink layer by the pressing spring 311*b* and the pivotable cam 317*b* is pivoted to thereby move the recording head 305 toward and away from the ink layer, but alternatively, as shown in FIG. 28, a link arm 318*a* may be secured to the rotatable shaft 311*a* of the recording head 305 and a push-pull solenoid 319 may be connected thereto through a link arm 318*b* to thereby provide the contacting and spacing means. If this is done, the recording head 305 will rotate in the direction of arrow G in response to the expansion and contraction of the armature 319*a* of the solenoid 319. Accordingly, by controlling the solenoid 319, the recording head 305 can be contacted with and spaced apart form the ink layer on the ink transport roller 1. Thus, the assembling work becomes easy. Further, even if the thickness of the ink layer varies, the recording head 305 pivots about the shaft 311*a* and bears against the ink layer always under a predetermined bearing condition and therefore, stable image recording can be accompolished.

Also, the ink using said bridge structure does not require chemical color forming and therefore, as compared with the generally known electro-chemical recording method. i.e., the electrolytic recording method using the color forming based on the oxidation-reduction reaction by electrical energization, image recording excellent in the stability and durability of image can be attained.

Further, the electrical conductivity of the ink 2 is imparted by ion conduction, and as the electrolyte therefor, use can be made of ionic substances of a wide range (many solutions are transparent) and therefore, it can be easily accomplished to provide ink of any color tone by a dye pigment or the like.

Other Embodiments

Other embodiments of the various members in the above-described embodiments will now be described.

(1) Ink Transport Means

In the aforedescribed embodiments, the cylindrical ink transport roller 1 has been shown as being used as the ink transport means, but alternatively, the ink transport means may be a belt or a sheet-like transport member. Such belt or sheet-like ink transport member may be designed to be paid away from one side and taken up at the other side, but it is preferable to cause such ink transport member to move endlessly for repetitive use.

Also, in the aforedescribed embodiments, the ink transport roller 1 is formed of an electrically conductive material, but where as will be described later, the roller 1 is not a part of the electrically energizing circuit, the roller 1 need not be formed of an electrically conductive material and may be formed of an insulating material such as resin.

(2) Fluid Ink

In the aforedescribed embodiments, tackiness is imparted to the ink by applying energy to the ink and an ink image is formed by the ink to which tackiness has been imparted, but the portion of the ink to which energy has not been applied may be endowed with tackiness and an ink image may be formed by that portion of the ink to which energy has not been applied.

(3) Coating Means

In the aforedescribed embodiments, the coating roller 4 is rotated in the direction of arrow E in FIG. 1, but this direction of rotation may be set to the direction opposite to the direction of arrow E. If this is done, the thickness of the ink layer formed on the surface of the ink transport roller 1 can be made smaller than when the coating roller is rotated in the direction of arrow E.

The coating means need not be restricted to the aforedescribed roller-like one, but may also be, for example, a blade or the like.

(4) Energy Applying Means

In the aforedescribed embodiments, when electrically energizing the ink 2, electric power is supplied from the recoridng head 5 (105, 205, 305) to the ink transport roller 1 through the ink 2, but alternatively, an electric current may be caused to flow between a number of electrode elements 5*b* arranged in a row.

Further, the aforedescribed energy applying means is designed to apply electrical energy, but alternatively, it may be designed to apply heat energy. In such case, a conventional thermal head may be used to apply Joule heat, but where it is necessary to prevent electro-chemical electrode reaction, an alternating signal sufficiently faster than the signal application period may be applied.

Where image formation is effected with heat energy applied as previously described, the undeveloped ink which has not been transferred to the intermediate transfer roller can be relaxed by cooling and again recover the bridge structure for reuse.

Also, when the ink is to be electrically energized to generate heat, electrical conductivity has heretofore been imparted to the ink containing electrically conductive powder (often black) therein (Japanese Patent Pablication No. 59-40627) and therefore, the color of the ink has often been limited to black, whereas ink 2 according to the present embodiment has electrical conductivity imparted thereto by ion conduction as previously described and therefore, ink of any color tone can be used.

(5) Biasing Means

In the aforedescribed first embodiment, the recording head 5 is designed to be pressed and biased by the pressing spring 11*b*, but alternatively, it may be designed to be pulled and pressed by a tension spring or to be pressed by other resilient member. As a further alternative, it may be constructed as shown in FIG. 8.

Figure 8:
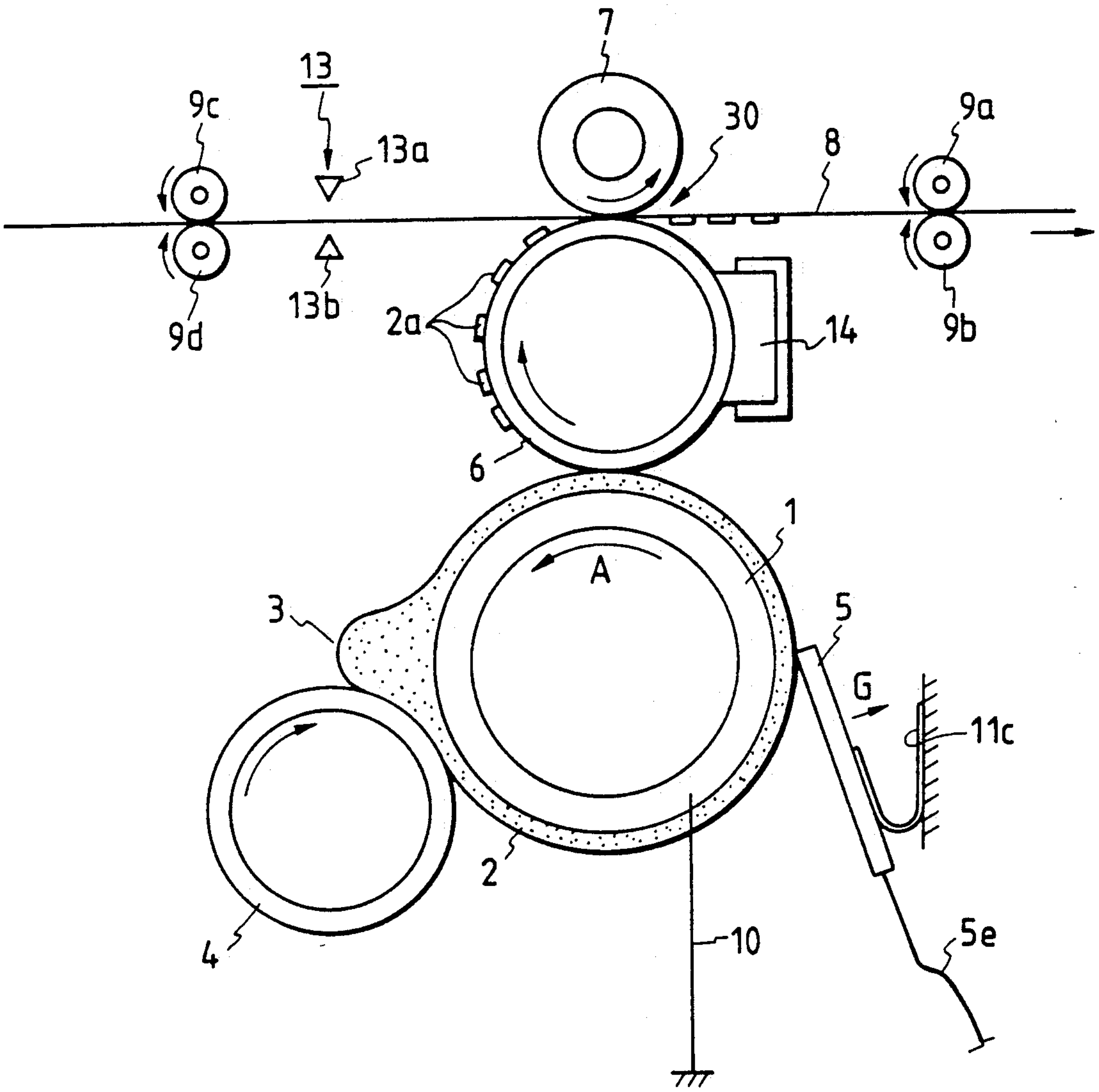
FIG. 8 illustrates an embodiment in which a V-shaped leaf spring is used as biasing means.
Figure 9:
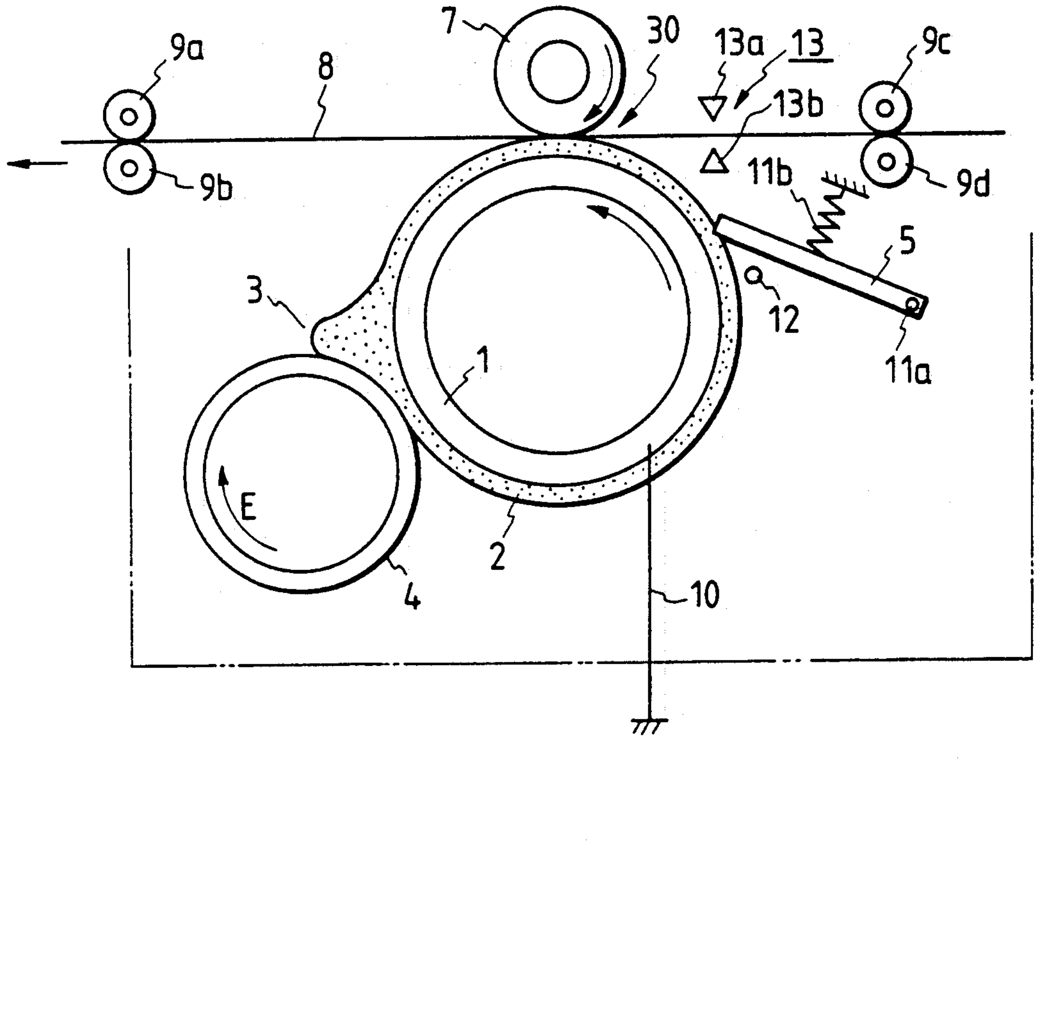
FIG. 9 illustrates an embodiment in which an intermediate transfer roller is not provided.

The construction of FIG. 8 is such that a leaf spring 11*c* of phosphor bronze having a thickness of 0.3 mm is formed into a V-shape and the recording head 5 is attached to the leaf spring 11*c*, and the leaf spring 11*c* is flexed in the direction of arrow G in FIG. 8 and the fore end of the recording head 5 is biased toward the ink layer by the reaction force thereof so that as in the aforedescribed first embodiment, the fore end portion of the recording head bears against the ink layer in such a manner as to slightly enter into the ink layer.

Further, in this construction, the V-shaped leaf spring 11*c* is disposed so that a gap S is created between the fore end portion of the recording head 5 and the ink transport roller 1 when the flexure of the V-shaped leaf spring 11*c* is zero, that is, when there is no biasing force. By doing so, the fore end portion of the recording head 5 can be prevented from contacting with the ink transport roller 1 even if the stopper 12 is not provided as in the first embodiment.

(6) Intermediate Transfer Medium

In the aforedescribed embodiments, the intermediate transfer roller 6 is used as the intermediate transfer medium, whereas like the ink transport means, this need not always be a roller, but a metallic or plastic film may be transported in one direction or an endless belt may be used.

Further, the intermediate transfer medium may not only be disposed at a predetermined interval from the ink transport roller 1, but also may be designed to impart pressure, for example, to the ink 2 on the ink transport roller 1.

Also, as shown in FIGS. 9, 15, 20 and 29, design may be made such that the image is transferred from the ink transport roller 1 directly to the recording sheet 8 without the intermediate transfer medium being provided.

(7) Cleaning Means

In the aforedescribed embodiments, the cleaning means 14 is provided to remove any ink untransferred to the recording sheet 8 from the intermediate transfer roller 6, but where the ink image 2*a* is completely transferred to the recording sheet 8, the cleaning means 14 need not always be provided.

(8) Recording Medium

As the recording medium, use may be made, for example, so-called plain paper or coat paper or a film formed of plastics such as polyester or a metal such as aluminum.

As described above in detail, according to the present invention, there can be provided an image recording apparatus which is capable of recording clear-cut images on a recording medium.

We claim:

1. An image recording apparatus for recording images on a recording medium, said apparatus comprising:

ink transport means for transporting fluid ink;

energy applying means for selectively applying energy to said ink transported by said ink transport means;

transfer means for transferring to the recording medium said ink whose transfer characteristic has been changed in conformity with the selective application of said energy, said transfer occurring at a location different from where said energy is applied;

coating means disposed upstream of said energy applying means with respect to the direction of transport of said ink by said ink transport means for applying said ink onto said ink transport means; and biasing means for biasing said energy applying means against said ink transported by said ink transport means, said biasing means biasing said energy applying means such that at least a minimum gap is maintained between said energy applying means and said ink transport means.

2. An image recording apparatus for recording images on a recording medium, said apparatus comprising:

ink transport means for transporting fluid ink;

coating means for supplying said fluid ink onto said ink transport means;

energy applying means disposed downstream of said coating means with respect to the direction of transport of said ink by said ink transport means for selectively applying energy to said ink transported by said ink transport means; and transfer means for transferring to the recording medium said ink whose transfer characteristic has been changed in conformity with the selective application of said energy, said transfer occurring at a location different from where said energy is applied;

said energy applying means being a recording head having as a base a flexible head base member formed of an insulating film on a flexible metallic material.

3. An image recording apparatus for recording images on a recording medium, said apparatus comprising:

ink transport means for transporting fluid ink;

coating means for supplying said fluid ink onto said ink transport means;

energy applying means disposed downstream of said coating means with respect to the direction of transport of said ink by said ink transport means for selectively applying energy to said ink transported by said ink transport means; and transfer means for transferring to the recording medium said ink whose transfer characteristic has been changed in conformity with the selective application of said energy, said transfer occurring at a location different from where said energy is applied;

said energy applying means being a recording head having as a base a flexible head base member, wherein said head base member is formed of a polyimide resin.

4. An image recording apparatus for recording images on a recording medium, having:

ink transport means for transporting fluid ink;

coating means for supplying said fluid ink onto said ink transport means;

energy applying means disposed downstream of said coating means with respect to the direction of transport of said ink by said ink transport means for selectively applying energy to said ink transported by said ink transport means;

transfer means for transferring to the recording medium said ink whose transfer characteristic has been changed in conformity with the selective application of said energy, said transfer occurring at a location different from where said energy is applied; and contacting and spacing means for contacting and spacing said energy applying means apart with respect to said ink transported by said ink transport means.

* * * * *

UNITED STATES PATENT AND TRADEMARK OFFICE
CERTIFICATE OF CORRECTION

PATENT NO. : 5,008,690

DATED : April 16, 1991

INVENTOR(S) : Norihiko Koizumi, et al.

It is certified that error appears in the above-identified patent and that said Letters Patent is hereby corrected as shown below:

[56] REFERENCES CITED:

Change "4,451,136 5/1984 Tanoika et al." to --4,451,136 5/1984 Tanioka et al.--.

COLUMN 3:

Line 24, change "envention" to --invention--.

COLUMN 4:

Line 3, change "surfact" to --surface--.

COLUMN 6:

Line 57, change "accomplised" to --accomplished--.

UNITED STATES PATENT AND TRADEMARK OFFICE
CERTIFICATE OF CORRECTION

PATENT NO. : 5,008,690

DATED : April 16, 1991

INVENTOR(S) : Norihiko Koizumi, et al.

It is certified that error appears in the above-identified patent and that said Letters Patent is hereby corrected as shown below:

COLUMN 11:

Line 39, change "if" to --is--.

COLUMN 13:

Line 7, change "conveYing" to --conveying--.

Line 37, change "recording head" to --recording head 205--.

COLUMN 15:

Line 5, change "315a" to --315c--.

COLUMN 17:

Line 61, change "sheet 9" to --sheet 8--.

Signed and Sealed this

Ninth Day of March, 1993

Attest:

STEPHEN G. KUNIN

*Attesting Officer* *Acting Commissioner of Patents and Trademarks*